United States Patent [19]
Carstens et al.

[11] Patent Number: 5,792,528
[45] Date of Patent: Aug. 11, 1998

[54] PROCESS FOR THE PRODUCTION OF PLASTIC COMPONENTS FOR CONTAINING AND/OR TRANSPORTING FLUIDS

[75] Inventors: Pieter A. B. Carstens, Pretoria; Georges A. B. M. G. Boyazis, Sandton, both of South Africa

[73] Assignee: Atomic Energy Corporation of South Africa Limited, Pelindaba, South Africa

[21] Appl. No.: 750,681

[22] PCT Filed: Jun. 16, 1995

[86] PCT No.: PCT/US95/07637

§ 371 Date: Dec. 16, 1996

§ 102(e) Date: Dec. 16, 1996

[87] PCT Pub. No.: WO95/35339

PCT Pub. Date: Dec. 28, 1995

[30] Foreign Application Priority Data

Jun. 17, 1994 [ZA] South Africa ............... 94/4341

[51] Int. Cl.⁶ .................................................. B29D 22/00
[52] U.S. Cl. ............. 428/36.1; 428/36.2; 427/248.1; 427/255.3; 427/255.4; 156/172; 156/187
[58] Field of Search ............................. 156/187, 172, 156/497, 308.6, 466; 427/248.1, 255.3, 255.4; 428/36.1, 36.2

[56] References Cited

U.S. PATENT DOCUMENTS

| | | | |
|---|---|---|---|
| 3,647,613 | 3/1972 | Scotland | 161/165 |
| 3,862,284 | 1/1975 | Dixon | 364/83 |
| 3,865,615 | 2/1975 | Manly | 117/47 |
| 4,020,223 | 4/1977 | Dixon | 428/224 |
| 4,081,574 | 3/1978 | Hawkins | 427/237 |
| 4,142,032 | 2/1979 | D'Angelo | 526/43 |
| 4,237,156 | 12/1980 | Boultinghouse | 427/255 |
| 4,264,750 | 4/1981 | Anand | 525/356 |
| 4,296,151 | 10/1981 | Boultinghouse | 427/255.1 |
| 4,404,256 | 9/1983 | Anand | 428/409 |
| 4,508,781 | 4/1985 | Yagi | 428/409 |
| 4,536,266 | 8/1985 | Bliefert | 204/159.18 |
| 4,557,945 | 12/1985 | Yagi | 427/40 |
| 4,743,419 | 5/1988 | Bierschenk | 264/83 |

(List continued on next page.)

FOREIGN PATENT DOCUMENTS

| | | |
|---|---|---|
| 788973 | 7/1963 | Canada. |
| 1068290 | 1/1993 | China. |
| 54-060367 | 5/1979 | Japan. |
| 62-070028 | 3/1987 | Japan. |
| 63-051136 | 3/1988 | Japan. |
| 63-207752 | 8/1988 | Japan. |
| 1159242 | 6/1989 | Japan. |
| 4097842 | 3/1992 | Japan. |
| 5329342 | 5/1992 | Japan. |
| 2116476 | 9/1983 | United Kingdom. |
| 1024996 | 4/1996 | United Kingdom. |

OTHER PUBLICATIONS

Database WPI Derwent Publications Ltd., London, GB; AN 87-126950[18] & JP, A, 62 070 028 (Bridgestone Tire KK) 31 Mar. 1987.

Database WPI Derwent Publications Ltd., London, GB; AN 79-476708[26] & JP, A, 54 060 367 (Mitsubishi Electri Corp.) 15 May 1979.

(List continued on next page.)

Primary Examiner—Shrive Beck
Assistant Examiner—Timothy Meeks
Attorney, Agent, or Firm—Ladas & Parry

[57] ABSTRACT

The invention provides a process for producing a component of a plastics material which is strengthened and reinforced by a resin-impregnated fibrous material which adheres to a surface thereof. The surface of the component is contacted with a fibrous material impregnated with a resin in a settable state, and setting of the resin is effected, while the fibrous material is caused to adhere to the surface of the component. The plastics component is a polyolefin material, and the surface is subjected to activation by oxyfluorination thereof prior to the contacting.

13 Claims, 17 Drawing Sheets

U.S. PATENT DOCUMENTS

| | | | |
|---|---|---|---|
| 4,764,405 | 8/1988 | Bauman | 428/35 |
| 4,818,619 | 4/1989 | Strepparola | 428/421 |
| 4,869,857 | 9/1989 | Eschwey | 264/83 |
| 4,869,859 | 9/1989 | Eschwey | 264/83 |
| 4,880,879 | 11/1989 | Bauman | 525/130 |
| 4,883,550 | 11/1989 | Overath | 156/171 |
| 5,021,297 | 6/1991 | Rhue et al. | 428/430 |
| 5,073,175 | 12/1991 | Anand | 55/16 |
| 5,275,882 | 1/1994 | Conley | 428/336 |

OTHER PUBLICATIONS

Database WPI Derwent Publications Ltd., London, GB; AN 92–170313|21| & JP, A, 4097842 (Asahi Chem. Ind. Co. Ltd.) 30 Mar. 1992.

Database WPI Derwent Publications Ltd., London, GB; AN 89–223628|31| & JP, A, 1159242 (Hitachi Chemical KK) 22 Jun. 1989.

Database WPI Derwent Publicatios Ltd., London, GB; AN 88–282661|40| & JP, A, 63 207 752 (Toyoda Gosei KK) 29 Aug. 1988.

Database WPI Derwent Publications Ltd., London, GB; AN 93–378045|48|0 & CN, A, 1068290 (Keji Oil Refinery) 27 Jan. 1993.

Database WPI Derwent Publications, Ltd., London, GB; AN 88–101602|15| & JP, A, 63 051 136 |Dainichi Nippon (Ables) 4 Mar. 1988.

English Abstract JP 5329342 (no date).

Hopkins, J. et al. "Equilbrium Glow Discharge . . . " J. Phys. Chem. 1995, 99, 4261, (no month).

Derwent Abstract, 87 116950.2 JP A 62070 Mar. 1987.

Derwent Abstract, 79–47670 B|26| JP 54 060 367, May 1979.

Derwent Abstract, 92–170313 & JP 4097842, 30 Mar. 1992.

Derwent Abstracts, AN 89223628 |31| JP A 1159242, Jun. 1989.

Derwent Abstract, AN 88–282661 |40| JP A 63207752, Aug. 1988.

Derwent Abstract:GB 2116476 Sep. 28,1983.

Derwent Abstract, AN 93–378045|48| CN, A, 1068290, Jan. 1993.

Derwent Abstract, AN 88–101602|15| JP, A, 63 051 136, Mar. 4, 1988.

FIG II

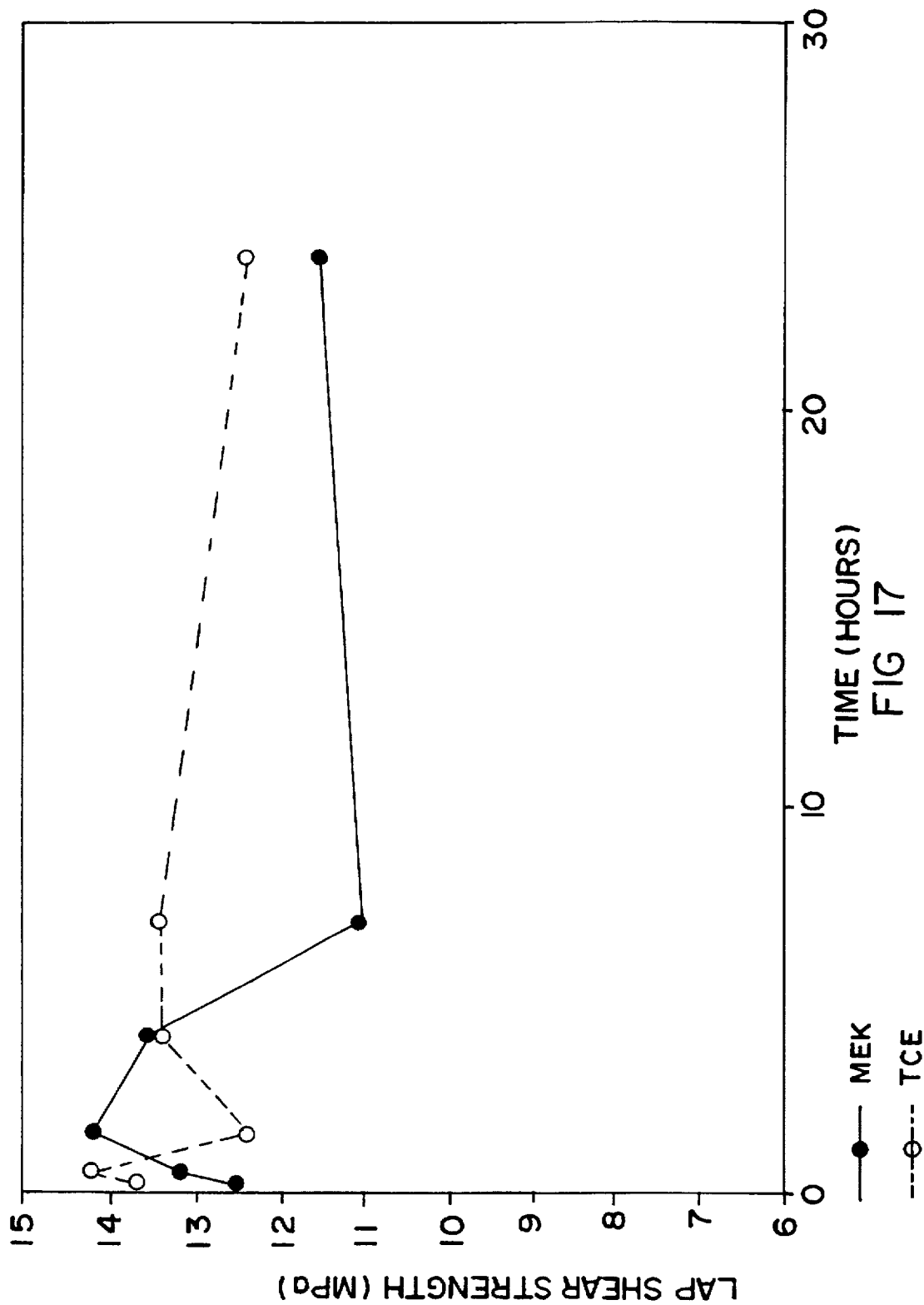

PROCESS FOR THE PRODUCTION OF PLASTIC COMPONENTS FOR CONTAINING AND/OR TRANSPORTING FLUIDS

FIELD OF THE INVENTION

THIS INVENTION relates to a process for the production of plastics components, eg components for containing and/ or transporting fluids, wherein the components are strengthened or reinforced by a resin-impregnated fibrous material. The invention also relates to such strengthened or reinforced components, in particular pipes and tanks, particularly when produced by means of said process.

By way of background the Applicant is aware that published Japanese Patent Application JP-A-62/070 028 discloses treatment of thermoplastic resin polyolefin, with a low temperature tetrafluorocarbon plasma. This treatment, however, is for the purpose of preparing the polyolefin surface for laminating the polyolefin with a layer of thermosetting resin by heating.

SUMMARY OF THE INVENTION

According to the invention, in the production of a component of a plastics material which is strengthened and reinforced by a fibrous material which has been impregnated with a resin which adheres to a surface of the component by contacting said surface of the component with said fibrous material impregnated with the resin in a settable state, and effecting setting of the resin to cause said resin-impregnated fibrous material to adhere to said surface of the component, the process which comprises using as the plastics material a polyolefin material and which includes the step, prior to the contacting, of subjecting said surface of the component to activation thereof, the activation being by surface fluorination in the form of oxyfluorination by exposing the surface of the component to an activating gas consisting essentially of molecules and comprising fluorine-containing molecules and oxygen-containing molecules at a pressure of 1–500 kPa, the gas being at a temperature of above 0° C., the plastics material of the component having a melting point above said gas temperature and the oxyfluorination acting to incorporate fluorine-containing substituents and oxygen-containing substituents, derived from the molecules of the activating gas, into the surface of the component.

By activation is meant that the surface of the component is brought into contact with a fluid in a fashion whereby atoms, molecules and/or radicals derived from the fluid are incorporated into the surface of the component.

The component may be tubular or hollow cylindrical, eg circular or square in cross-section, suitable for containing and/or transporting a fluid. In particular the component may be a pipe or pipe fitting, or a tank. While the polyolefin material may be any suitable hydrocarbon polymer, typically, the polyolefin material is polyethylene (PE), eg high density polyethylene (HDPE), polypropylene (PP), or polyolefinic copolymers such as copolymers of ethylene and propylene, eg ethylene-propylene-diene monomer elastomer (EPDM), or blends of such polymers. Accordingly, the polyolefin material may be selected from the group consisting of polyethylenes, polypropylenes, copolymers of ethylene and propylene and blends of such polyolefins; and the surface activation may act to provide the surface-activated component with a surface tension at 20° C. of at least 40 mN/m. The polyolefins used include unmodified or modified polyolefins, eg those modified by containing ethyl vinyl acetate as an impact modifier.

DESCRIPTION OF THE RELATED ART

Any suitable surface fluorination technique can be used to fluorinate the surface of the component before the fibrous material is adhesively secured thereto. By fluorinated is meant that the surface of the pipe or tank is treated with a fluorine-containing gas to provide fluorine substituents bound to said surface. Examples of suitable fluorinating techniques include, for example, those described in U.S. Pat. Nos. 3,647,613; 3,862,284; 3,865,615; 4,020,223; 4,081, 574; 4,142,032; 4,296,151; 4,508,781; 4,536,266; 4,557, 945; 4,764,405; and 4,869,859 as well as published European Patent Application EP 0 21 4 635, and South African Patents Nos. 85/9500 and 87/8240, at least some of which describe techniques which can be adapted for the oxyfluorination mentioned hereunder.

Preferably the activation is by surface fluorination, more preferably surface oxyfluorination, and may be by exposing the surface to be fluorinated to a fluorine-containing gas at a pressure of 5–150 kPa, and at a temperature typically of 20°–100° C. By oxyfluorination is meant that the surface is provided with fluorine and oxygen substituents, eg on —$CH_2$ and/or —$CH_3$ groups forming part of the surface. The fluorine-containing gas may comprise fluorine itself ($F_2$), it may comprise gaseous compounds containing fluorine such as $CF_6$ or $SF_6$, it may comprise a fluorinated noble gas such as $XeF_2$, or it may comprise a fluorohalogen such as $ClF_3$, $BrF_5$, $IF_7$, or the like. It should further be noted that both fluorination and oxyfluorination can in principle be carried out in inert liquid media in which a fluorinating compound such as a fluorine-containing gas of the type mentioned above is dissolved, with or without oxygen ($O_2$ or $O_3$); The fluorine-containing gas may form part of a mixture with other gases, such as oxides of sulphur, oxides of nitrogen or oxides of carbon, halogens, interhalogens, nitrogen, oxygen, ozone or mixtures thereof, such as air. The proportion of the fluorine-containing gas in such gas mixture can vary within wide limits, the fluorine-containing gas forming 0.1–99.9% by volume of said mixture, typically forming 1–30% by volume thereof. Particularly preferred gas mixtures include those comprising 5–20% by volume of fluorinating gas such as $F_2$ and 5–95% by volume oxygen ($O_2$ or $O_3$), so that the surface fluorination is a surface oxyfluorination. The fluorination will usually take place in a reactor comprising a vacuum chamber with provision for feeding thereto and withdrawal therefrom of gases, pressure control, temperature control and control of the composition of gas mixtures therein, and will normally be carried out batchwise. Accordingly, the fluorine-containing gas may form part of a mixture with other gases, the fluorine-containing gas forming 1–30% by volume of said mixture and the temperature being 20°–100° C.; and in this case, as indicated above, the gas mixture preferably comprises 5–20% by volume of the fluorine-containing gas and 5–95% by volume of oxygen, so that the surface fluorination is a surface oxyfluorination.

As indicated above, the surface fluorination may be such as to provide the surface activated component with a surface tension at 20° C. of at least 40 mN/m, preferably at least 45 mN/m.

After the oxyfluorination of the surface, the surface may be subjected to post-fluorination hydrolysis treatment, as far as possible to hydrolyse additional hydrolysable chemical functional groups on the surface. In other words, after said oxyfluorination, the surface may be subjected to hydrolysis, to hydrolyse non-hydrolised chemical functional groups on the surface. The post-fluorination hydrolysis treatment may be carried out by bringing the fluorinated surface Into contact with atmospheric moisture for a sufficient period of time for a desired degree of hydrolysis to occur, or by contacting the surface with an aqueous base for a sufficient period of time, or by contacting the surface with an aqueous acid for a sufficient period of time, or by bringing the surface into contact with water for a sufficient period of time, to obtain a desired degree of hydrolysis.

The resin used to impregnate the fibrous material (and/or to cause the fibrous material to adhere to the activated surface as described hereunder) may be a curable settable thermosetting resin, eg a polyester or an epoxy resin. Examples of polyester resins suitable in particular for adhering the fibrous material to the activated surface are those available in South Africa as CRYSTIC 392 (isothalic neopentyl glycol unsaturated polyester resin), CRYSTIC 600 (bisphenolic unsaturated polyester resin) and CRYSTIC N7384PA (isothalic pre accelerated unsaturated polyester resin) from NCS Resins, a division of Sentrachem Limited. Generally, for the impregnation of the fibrous layer, any suitable polyester resin is used. Examples of suitable epoxy resins for adhesion of the fibrous layer to the activated surface are those available in South Africa as PRO-STRUCT 7907 from Pro-struct, a division of KayMac Limited, DION 6694 and DION 9100 (bisphenol epoxy vinyl esters) available from from NCS Resins, a division of Sentrachem Limited, and DERAKANE 470 and DERAKANE 8084, epoxy vinyl ester resins available in South Africa from Dow Chemical Company. An example of an epoxy resin which can be used for impregnating the fibrous material is PRO-STRUCT 988, also available from Prostruct.

Typically, the curing of the resin will comprise using a suitable curing agent or catalyst, eg a commercial curing system or package supplied by, and used in an amount as recommended by, the manufacturer of the resin used.

The resin-impregnated fibrous material may comprise inorganic fibres, eg glass fibres or carbon (eg graphite) fibres. High tenacity synthetic plastics fibres, eg of a polyester, a polyolefin, or a polyamide such as KEVLAR (registered trade mark), may also be used. Mixtures of said fibres may also be used. Both the inorganic and the synthetic fibres may be fluorinated. Thus, the fibrous material may be subjected to surface fluorination thereof prior to impregnation thereof with resin; and the fibrous material may have fibres which are selected from the group consisting of glass fibres, carbon fibres, polyester fibres, polyamide fibres, polyolefin fibres and mixtures thereof. The fibres may be in the form of chopped strand mat, unidirectional roving, woven roving or continuous roving.

According to an important feature of the invention, the reinforcing material optionally comprises a plurality of resin-impregnated fibrous layers, the layers adjacent and nearer the pipe or tank surface being resin-rich and the layers further away from the pipe or tank surface being resin-poor. Typically, the mass ratio of resin to fibres in the layer nearest to the pipe or tank surface is greater than 70:30 and the mass ratio of resin to fibres in the layer furthest away from the pipe or tank surface is less, being about 70:30 for chopped strand mat, about 50:50 for unidirectional or woven roving, and about 30:70 for continuous roving. Typically the highest mass ratio of resin to fibres is maintained for the first few millimetres thickness closest to the activated surface, eg 1–2 mm. In other words, the process may comprise reinforcing the component with a plurality of resin-impregnated fibrous layers, the mass ratio of resin:fibres in the layer closest to the activated surface of the component being at least 70:30, preferably at least 80:20 or more, such as 90:10 or more, and the mass ratio of resin:fibres in the layer furthest from the activated surface of the component surface being 70:30 - 30:70, said mass ratio decreasing in a direction away from the activated surface and normal thereto. By this means, a good wetting by the resin on the surface of the pipe or tank-is achieved which improves the adhesion of the resin to the pipe or tank surface.

The surface of the pipe or the tank may be subjected to degreasing prior to fluorination thereof and/or after fluorination and prior to applying the layer of resin-impregnated material thereto to improve the adhesion of the wrapping material to the pipe surface or the tank surface. Accordingly, the surface may be subjected to degreasing prior to said activation thereof. Furthermore, the surface may, after said activation thereof and prior to the contacting, be subjected to decreasing. If desired, the pipe or tank may be packaged after degreasing thereof until the pipe or tank is required to be subjected to fluorination and/or to wrapping thereof by the resin impregnated material.

Suitable degreasing agents used to degrease the pipe surface or the tank surface may be selected from acetone, ethanol, methyl ethyl ketone (MEK) and trichloro-ethylene (TCE). Water-soluble detergents can also be used. Naturally routine experimentation will be employed to determine which degreasing agents are compatible with the pipe surface or the tank surface and with the resins employed in the process of the invention.

According to a further feature of the invention, to improve the adhesion of the wrapping material to the pipe surface or tank surface when the resin in the resin-impregnated fibrous wrapping material is a polyester resin, one or more layers or coatings of an epoxy resin may be applied, eg by painting, to the activated surface of the pipe or tank prior to applying the layers of polyester resin-impregnated fibres thereto. The resin used to impregnate the fibrous material and the resin used to cause the fibrous material to adhere to the surface of the component may be the same, or they may be different. Accordingly, causing the fibrous material to adhere to the surface of the component may be by means of a resin which is different from the resin which impregnates the fibrous material, each resin being selected from epoxy resins and polyester resins. Instead, causing the fibrous material to adhere to the surface of the component may be by means of a resin which is the same as the resin which impregnates the fibrous material, each resin being selected from epoxy resins and polyester resins.

Application of the resin-impregnated fibrous; layers to the fluorinated surface of the pipe or tank may be by hand lamination, tape wrapping or filament winding.

Plastics pipes are widely used for the transport of fluids and the pressure in such pipes may vary from subatmospheric (vacuum) up to tens of atmospheres. Polyolefin pipes and tanks are reinforced by the process of the invention to increase their pressure rating and/or to increase their rigidity. For both purposes, the reinforcing process according to the invention is similar. However, thicker layers of resin-impregnated fibrous material are typically required to increase pressure rating.

For increasing the pressure rating of said polyolefin pipes, hand laminating or tape wrapping is conveniently started by coating the activated surface with the resin (eg CRYSTIC 600, CRYSTIC 392 or PRO-STRUCT 7907) used to cause the impregnated fibrous material to adhere thereto. A layer of glass fibre chopped strand mat (i.e. a chopped strand mat of glass fibres or filaments pressed together in a multidirectional manner) typically impregnated with a polyester resin or epoxy resin, is then typically laminated into place. These layers can be alternated, with layers of unidirectional roving or woven roving, or laminating can be restricted to said chopped strand mat. The laminating process is preferably finished with a glass or other synthetic fibre tissue (eg a thin glass fibre mat) and the resin is cured according to the resin manufacturer's specifications, to set it.

For increasing the rigidity of said polyolefin pipes or tanks, hand lamination or tape wrapping is again conveniently started by coating the activated surface with said CRYSTIC 600 or 392 or PRO-STRUCT 7907 resins and laminated to the required thickness with chopped strand mat by itself or with chopped strand mat alternating with unidirectional roving or woven roving. To finish the laminating process, said glass or other synthetic fibre tissue is again used.

Filament winding is similar to the above hand laminating or tape wrapping process for increasing the pressure rating of said polyolefin pipes and increasing the rigidity of said polyolefin pipes and tanks, and only the thickness of laminating is changed if required. In filament winding, a glass fibre filament is dipped through a resin bath and wrapped on eg a pipe in one continuous strand unidirectionally along the pipe. The applicator arm then returns along the length of the pipe unidirectionally in the opposite direction. Thus, the filament is applied in a bidirectional way.

While the three processes, i.e. hand lamination, tape wrapping and machine filament winding, are substantially different, certain ratios of fibre to resin, ratios of catalyst, temperature and many others remain a common denominator. It will be appreciated that filament winding will normally be more effective than hand lamination or tape wrapping.

The invention extends further to a component of plastics material which is strengthened and reinforced by a resin-impregnated fibrous material which adheres to a surface of the component, produced in accordance with the process described above.

The invention will now be described, by way of non-limiting illustrative example, with reference to the following tests and experiments and with reference to the accompanying drawings.

BRIEF DESCRIPTION OF THE DRAWINGS

FIG. 17 shows a plot of lap shear strength against post-degreasing drying time in hours when oxyfluorinattion is employed using MEK or TEC as degreasing agent and the resin being CRYSTIC 392.

DESCRIPTION OF THE PREFERRED EMBODIMENTS

Figure 1:
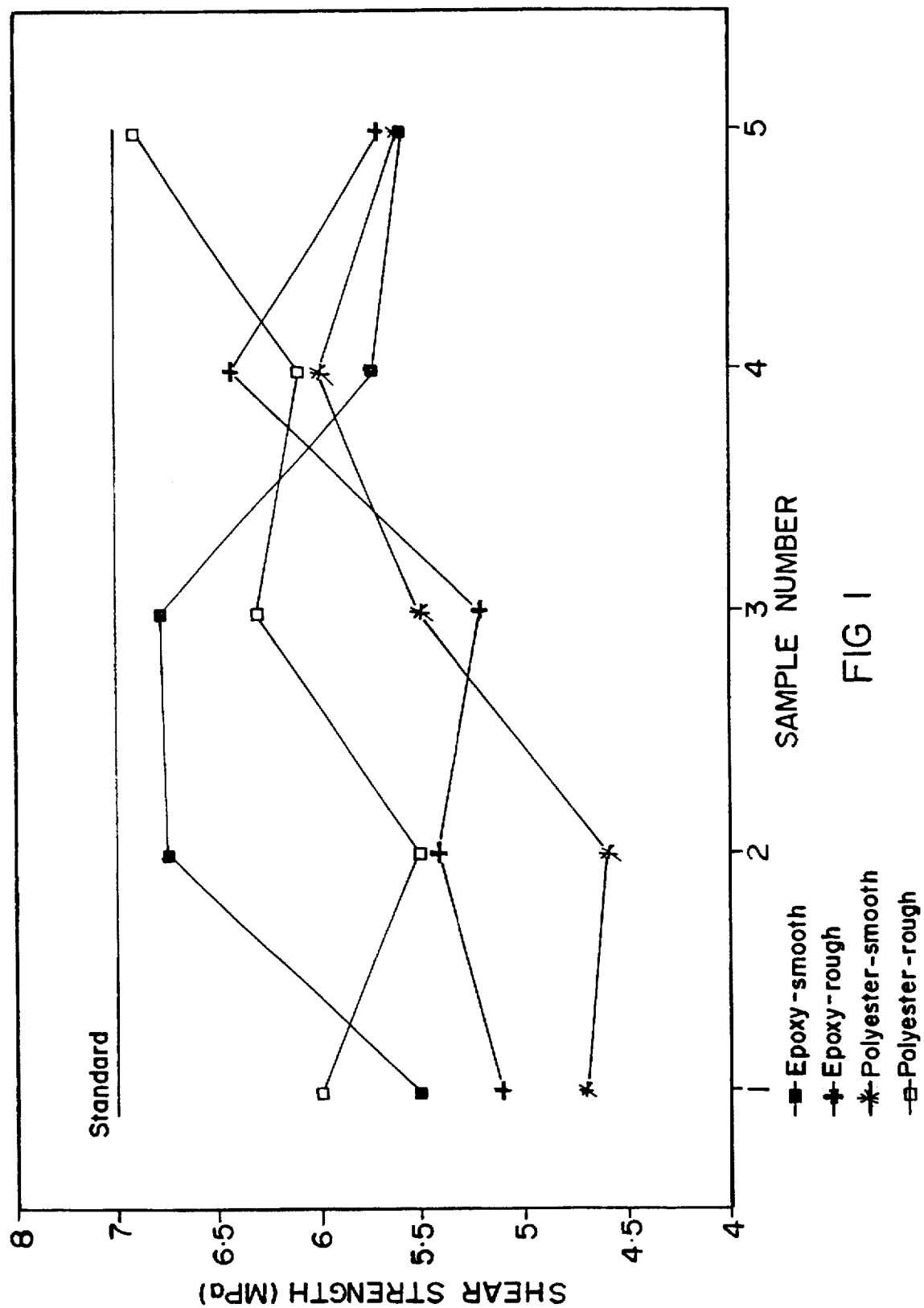
FIG. 1 shows a plot of shear strength (MPa) against sample number for high density polyethylene pipe samples provided with a reinforcing of epoxy resin-impregnated glass fibres or polyester resin-impregnated glass fibres according to the process of the invention, with reference to the required shear strength according to British Standard B.S. 6464 to illustrate the strength profile of HDPE pipes.
Figure 2:
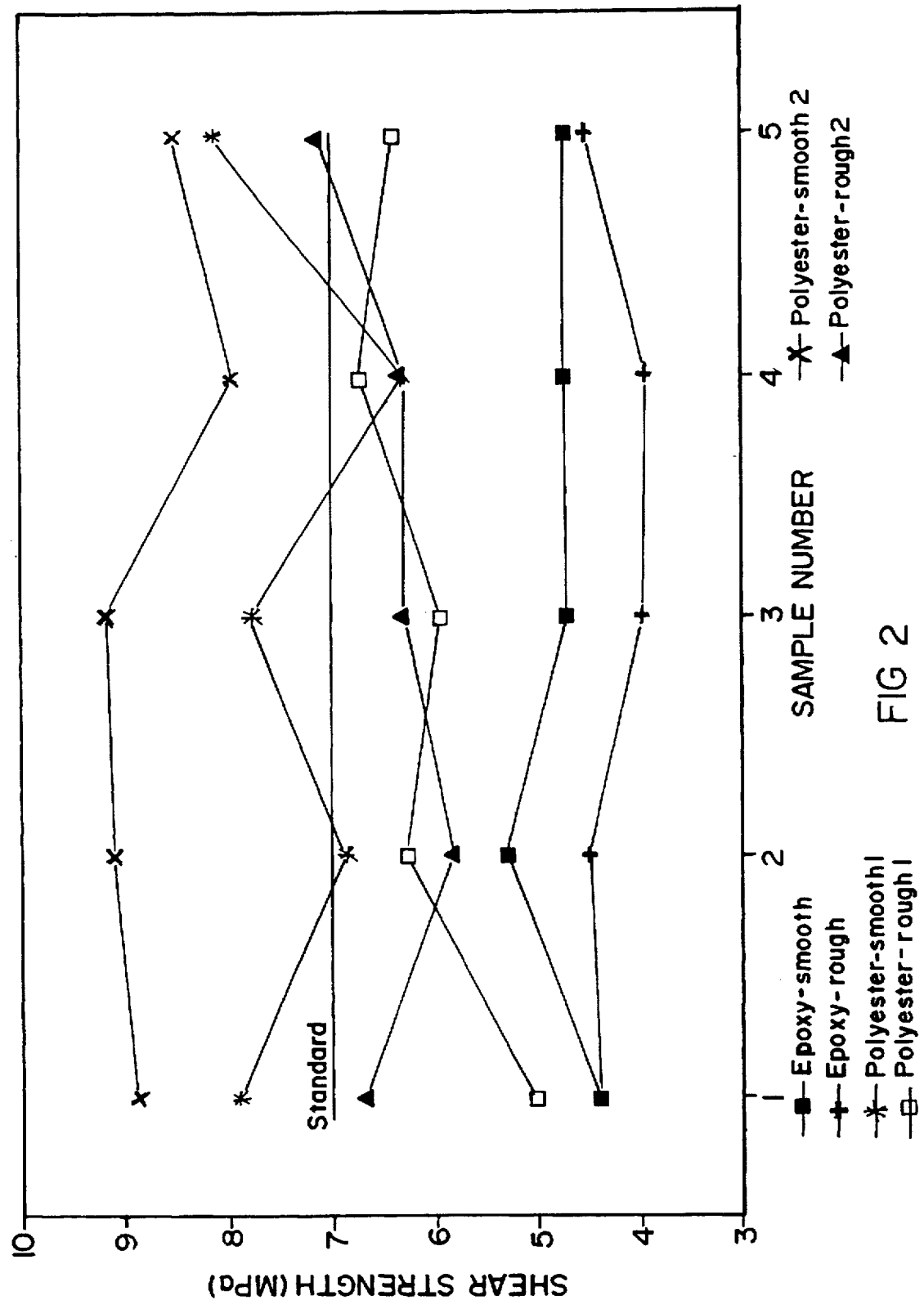
FIG. 2 shows a plot of shear strength (MPa) against sample number for polypropylene pipe samples provided with a reinforcing of epoxy-resin impregnated glass fibres or polyester resin-impregnated glass fibres according to the process of the invention, with reference to the required shear strength according to British Standard B.S. 6464 to illustrate the strength profile of PP pipes.
Figure 3:
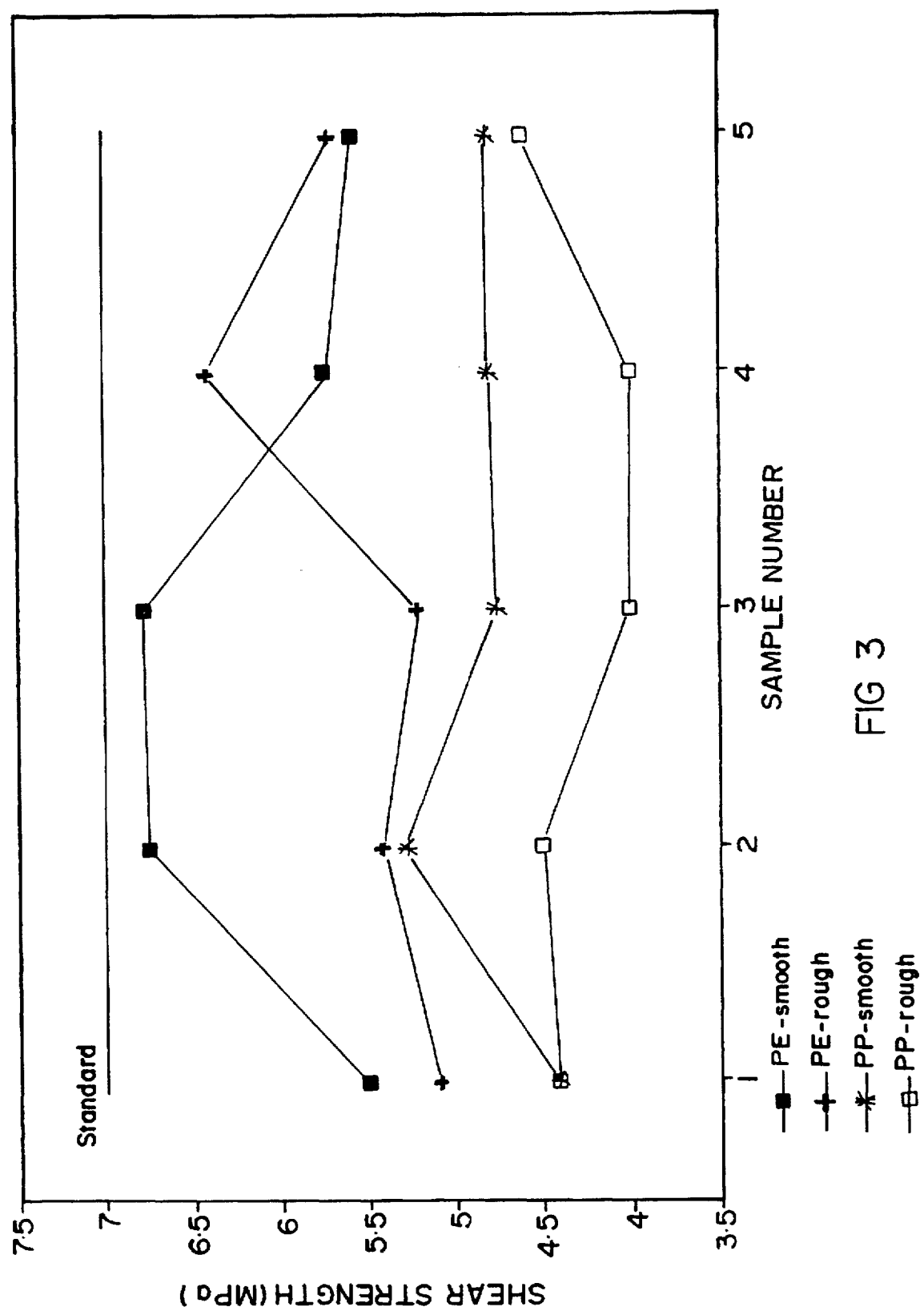
FIG. 3 shows a plot of shear strength (MPa) against sample number for high density polyethylene and polypropylene pipe samples provided with a reinforcing of epoxy resin-impregnated fibres according to the process of the invention, with reference to the required shear strength according to British Standard B.S. 6464 to illustrate the strength profile using an epoxy resin.
Figure 4:
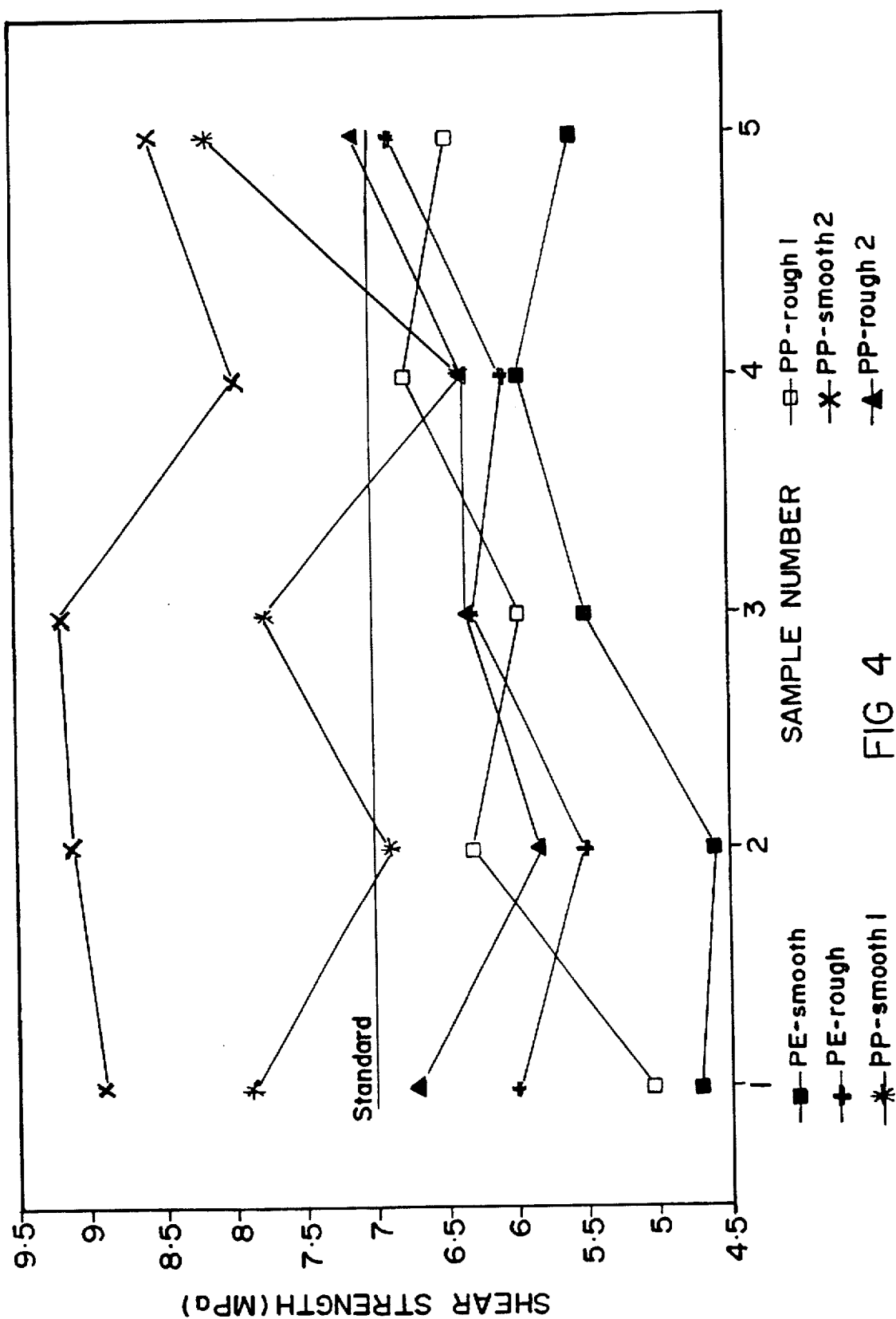
FIG. 4 shows a plot of shear strength (MPa) against sample number for high density polyethylene and polypropylene pipe samples having a reinforcing of polyester resin-impregnated fibres according to the invention, with reference to the required shear strength according to British Standard B.S. 6464 to illustrate the strength profile using a polyester resin.

Push out tests were done on HDPE and PP pipe samples which were provided with external reinforcing of epoxy resin-impregnated glass fibres by the process according to the invention. Similar tests were done on similar pipe samples provided with a similar reinforcing of polyester resin-impregnated glass fibres by the process according to the invention.

Five pipes were used, two HDPE pipes and three PP pipes. The HDPE pipes were each 110 mm OD class 6 pipe having a wall thickness of 6 mm. The HDPE was GM 5010 available from Megapipe, a division of Mega Plastics which in turn is a division of Sentrachem Limited. The PP pipes were 90 mm OD class 4 pipe having a wall thickness of 5 mm. The PP was PPHI 2222 available from Megapipe.

The HDPE pipes were reinforced in accordance with the process of the invention by the following procedure. Half of the first pipe was knurled (roughened) on its outer surface while the other half was left smooth on its outer surface. The rough and smooth outer surfaces of pipe were then fluorinated. The fluorination was carried out batchwise in an 11 $m^3$ mild steel reactor. A pipe sample was placed in the reactor and the reactor was evacuated to an absolute pressure of 20 kPa. Then a $F_2/N_2$ mixture comprising 20% by volume $F_2$ was bled into the reactor to a total pressure of 30 kPa. The fluorination was carried out at room temperature for 30 minutes, after which the reactor was evacuated and the sample removed. The fluorinated pipe was then wrapped by hand laminating with a glass fibre mat, either chopped strand or unidirectional roving available from NCS Resins, a division of Sentrachem Limited, using an epoxy resin available as PRO-STRUCT 988 from Prostruct, a division of KayMac Limited, to a thickness of 4 mm. Said PRO-STRUCT 988 was cured using a commercial curing package supplied by, and used in, an amount as recommended by, the manufacturer of PRO-STRUCT 988. The hand laminating involved the application of the epoxy resin onto the pipe followed by a layer of the glass fibre mat. The process was continued, alternating between the glass and the resin until said thickness was achieved, after which a final layer of a thin layer of tissue (thin glass fibre mat), available from NCS Resins, was applied. It is important in this process to eliminate all air bubbles from between the layers of glass and resin, by rolling them out with special applicator rollers commonly used in the industry. For the first 1-2 mm of the wrapping, the resin to glass mass ratio was 50:50 and was then changed to 30:70 until the thickness of 4 mm was obtained.

The second HDPE pipe was roughened on half of its outer surface, and the rough and smooth outer surfaces were fluorinated, in the same way as described for the first HDPE pipe. After fluorination, the pipe was wound by hand laminating with said glass fibre mat using a polyester resin available as CRYSTIC 600 from NCS Resins to a thickness of 5 mm. This treatment was less labour intensive than that for the first HDPE pipe. The hand laminating process was similar to that used for the first HDPE pipe, using a curing package supplied by, and used in an amount recommended by, the supplier of CRYSTIC 600.

The PP pipes were treated and wrapped in a similar fashion, except that one was wrapped using said epoxy resin and two were wrapped using said polyester resin, one at low temperature (±20°0 C.) and one at high temperature (±26° C.).

The pipes were cut into 60 mm lengths to form samples numbered as follows:

| 1 | 2 | 3 | 4 | 5 |
|---|---|---|---|---|

A 15 mm length of the HDPE or PP was machined out of each end of each 60 mm length for the purposes of push out tests conducted in accordance with B.S. 6464. The push out tests involved the remaining length of the HDPE or PP pipe of the test pieces being pushed out of the overwrapping and measuring the force required to do so. The shear strength or "push-out" strength was then calculated as follows:

$$\text{Shear strength}(Mpa) = \frac{F}{d.\pi.h}$$

where

F=maximum force required to shear the pipe from the overwrapping |N| d=pipe outerdiameter (mm)

h=remaining encapsulated plastics liner length (mm)

The push out test results are summarised in Table 1 below. The supporting strength profiles viz. the strength profile of the HDPE pipe samples, the strength profile of the PP pipe samples, the strength profile of the pipe samples using epoxy resin and the strength profile of the pipe samples using polyester resin are shown in the accompanying FIGS. 1 to 4 respectively. Each of FIGS. 1–4 shows for comparison the required shear strength according ito the British Standard B.S. 6464.

Table 1 also shows the average shear forces, taking all the test results, as well as the average when disregarding the highest and lowest values. The standard deviation and variance is also shown, and then finally, whether or not the shear strength of the pipe samples matches or exceeds that specified by B.S. 6464.

From Table 1, it can be seen that the smooth PP pipe samples wrapped using the polyester resin comply with B.S. 6464. The other pipe samples, though not complying to B.S. 6464, fared well.

Detailed results, with the parameters used in the calculation are give in Tables 2–7 below.

TABLE 1

| SAMPLE NO. | SUMMARY OF RESULTS OF THE PUSH OUT TESTS | | | | | | | | | |
|---|---|---|---|---|---|---|---|---|---|---|
| | SHEAR STRENGTH (MPa) | | | | | | | | | |
| | 1 | 2 | 3 | 4 | 5 | 6 | 7 | 8 | 9 | 10 |
| 1 | 5.5 | 5.1 | 4.4 | 4.4 | 4.7 | 6 | 7.9 | 5.02 | 8.9 | 6.71 |
| 2 | 6.75 | 5.41 | 5.3 | 4.5 | 4.6 | 5.5 | 6.9 | 6.3 | 9.1 | 5.83 |
| 3 | 6.78 | 5.21 | 4.75 | 4 | 5.5 | 6.3 | 7.8 | 5.98 | 9.2 | 6.36 |
| 4 | 5.72 | 6.42 | 4.8 | 4 | 6 | 6.1 | 6.4 | 6.8 | 8 | 6.37 |
| 5 | 5.57 | 5.69 | 4.8 | 4.6 | 5.6 | 6.9 | 8.2 | 6.5 | 8.6 | 7.11 |
| Average | 6.06 | 5.57 | 4.81 | 4.3 | 5.28 | 6.16 | 7.44 | 6.12 | 8.76 | 6.48 |
| Average 1 | 6.01 | 5.44 | 4.78 | 4.3 | 5.21 | 6.13 | 7.53 | 6.26 | 8.87 | 6.48 |
| Std devn | 0.58 | 0.47 | 0.29 | 0.25 | 0.54 | 0.45 | 0.68 | 0.61 | 0.43 | 0.42 |
| Variance | 0.33 | 0.22 | 0.08 | 0.06 | 0.29 | 0.21 | 0.46 | 0.37 | 0.19 | 0.18 |
| Acceptable | NO | NO | NO | NO | NO | NO | YES | NO | YES | NO |

Legend
1 PE In Epoxy resin - smooth
2 PE In Epoxy resin - rough
3 PP In Epoxy resin - smooth
4 PP In Epoxy resin - rough
5 PE In Polyester resin - smooth
6 PE In Polyester resin - rough
7 PP In Polyester resin - smooth 1 (low temperature wrapping ± 20° C.)
8 PP In Polyester resin - rough 1 (low temperature wrapping ± 20° C.)
9 PP In Polyester resin - smooth 2 (high temperature wrapping ± 26° C.)
10 PP In Polyester resin - rough 2 (high temperature wrapping ± 26° C.)
Average 1 Highest and lowest not Included

TABLE 2a

Epoxy Resin/HDPE (smooth)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 31 | 110 | 59.7 | 5.5 |
| 2 | 30 | 110 | 70.0 | 6.75 |
| 3 | 30 | 110 | 70.3 | 6.78 |
| 4 | 31 | 110 | 59.3 | 5.72 |
| 5 | 30 | 110 | 57.8 | 5.57 |

TABLE 2b

Epoxy Resin/HDPE (rough)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 30 | 110 | 52.8 | 5.10 |
| 2 | 31 | 110 | 57.9 | 5.41 |
| 3 | 31 | 110 | 55.8 | 5.21 |
| 4 | 30 | 110 | 66.5 | 6.42 |
| 5 | 30 | 110 | 58.0 | 5.69 |

TABLE 3a

Polyester/HDPE (smooth)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 29 | 110 | 47.2 | 4.7 |
| 2 | 29 | 110 | 46.1 | 4.6 |
| 3 | 29 | 111 | 56.0 | 5.5 |
| 4 | 29 | 111 | 61.4 | 6.0 |
| 5 | 29 | 110 | 56.1 | 5.6 |

TABLE 3b

Polyester/HDPE (rough)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 29 | 110 | 60.2 | 6.0 |
| 2 | 29 | 110 | 54.7 | 5.5 |
| 3 | 29 | 110 | 63.7 | 6.3 |
| 4 | 30 | 110 | 63.1 | 6.1 |
| 5 | 29 | 110 | 69.0 | 6.9 |

TABLE 4a

CRYSTIC 600 (dark)/PP (rough)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 31 | 89 | 58.2 | 6.71 |
| 2 | 29 | 90 | 48.28 | 5.83 |
| 3 | 30 | 90 | 54.0 | 6.36 |
| 4 | 30 | 89 | 55.2 | 6.37 |
| 5 | 30 | 89 | 61.6 | 7.11 |

TABLE 4b

CRYSTIC 600 (dark)/PP (smooth)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 30 | 90 | 75.7 | 8.9 |
| 2 | 30 | 90 | 77.4 | 9.1 |
| 3 | 29 | 89 | 77.9 | 9.2 |
| 4 | 31 | 89 | 69.7 | 8.0 |
| 5 | 30 | 90 | 73.1 | 8.6 |

TABLE 5a

CRYSTIC 600 (lighter)/PP (rough)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 31 | 90 | 44.0 | 5.02 |
| 2 | 30 | 89 | 53.2 | 6.3 |
| 3 | 30 | 90 | 50.71 | 5.98 |
| 4 | 29 | 90 | 56.0 | 6.8 |
| 5 | 30 | 90 | 55.5 | 6.5 |

TABLE 5b

CRYSTIC 600 (lighter)/PP (smooth)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 30 | 90 | 67.3 | 7.9 |
| 2 | 30 | 90 | 58.6 | 6.9 |
| 3 | 29 | 90 | 64.1 | 7.8 |
| 4 | 31 | 89 | 55.8 | 6.4 |
| 5 | 30 | 90 | 69.3 | 8.2 |

TABLE 6a

Epoxy/PP (smooth)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 31 | 90 | 38.37 | 4.4 |
| 2 | 30 | 90 | 45.48 | 5.3 |
| 3 | 30 | 89 | 39.82 | 4.75 |
| 4 | 31 | 90 | 41.98 | 4.8 |
| 5 | 30 | 90 | 40.37 | 4.8 |

TABLE 6b

Epoxy/PP (rough)

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 30 | 89 | 36.72 | 4.4 |
| 2 | 30 | 89 | 37.98 | 4.5 |
| 3 | 30 | 89 | 33.4 | 4.0 |
| 4 | 30 | 90 | 34.05 | 4.0 |
| 5 | 29 | 90 | 37.84 | 4.6 |

Table 7 below, there are presented detailed results similar to Tables 2–6 above using smooth HDPE and PP pipe samples overwrapped by machine wrapping using said epoxy resin PRO-STRUCT 988. A glass filament was dipped in a bath of the epoxy/curing system and wrapped on the pipe in one continuous strand unederectionally along the pipe. The applicator arm then moved along the length of the pipe unidirectionally in the opposite direction. Thus, the filament was applied in a bidirectional way. The general thickness of the laminate was 5 mm. After curing according to the manufacturer's specifications, the test samples were subjected to push out tests as described above.

TABLE 7a

Epoxy/HDPE Machine Wrapping

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 31.0 | 112.0 | 44.69 | 4.31 |
| 2 | 29.4 | 111.0 | 18.75 | 1.83 |
| 3 | 30.5 | 112.0 | 49.52 | 4.81 |

TABLE 7b

Epoxy/PP Machine Wrapping

| SAMPLE NO. | HIGHEST VALUE OF PIPE LENGTH [mm] | PIPE OUTER DIAMETER [mm] | MAXIMUM SHEAR FORCE [N] | SHEAR STRENGTH [MPa] |
|---|---|---|---|---|
| 1 | 30.0 | 110.0 | 40.2 | 3.68 |
| 2 | 29.5 | 110.4 | 58.7 | 5.72 |
| 3 | 29.5 | 111.0 | 87.1 | 8.12 |

The various experiments described below serve to demonstrate the effect of various process variables on the process of the invention. The effects of these variables are expressed in terms of final lap shear adhesive strength achieved by varying the relevant process variable while keeping the remaining variables constant. A different quantifying technique was used to evaluate the effect of changes in specific variables when hydrolysis times were investigated, in conjunction with the shear strength test technique as hereinbefore described.

Lap shear adhesive strengths were derived from adhesive strengths obtained by applying polyester by itself (ie without glass fibre reinforcing) to masked areas on plastics sheet surfaces 26 mm wide and either 10 mm or 15 mm long (overlap length) and measuring the lap shear strengths thereof. The plastics sheets used to manufacture the lap shear joints were 60 mm long, 26 mm wide and 2 mm thick. The reverse sides of the sheets were glued to 26 mm wide and 6.25 mm thick steel backing plates by means of an epoxy resin over the full length and width of each sheet. The purpose of the steel backing plate was to eliminate the occurrence of any turning moment in the overlap joint of the plastics sheet under stress, and also to reduce or eliminate any peeling characteristics in the lap shear test. A further purpose of the steel plate was to serve as a mechanical attachment for the application of a shear force in the mechanical test apparatus (insron 4465 tensometer fitted with a 5 kN load cell). Each test co-ordinate was derived from an average of five (quintuplet) lap shear strength tests.

All resins used were obtained from NCS Resins, a division of Sentrachem Limited and are set out below:

Crystic N7384PA—isothalic pre accelerated unsaturated polyester resin.

Dion 9100 —Bisphenol epoxy vinyl ester.

Crystic 392 —isothalic neopentyl glycol unsaturated polyester resin.

Crystic 600—Bisphenolic unsaturated polyester resin.

The plastics sheet material samples used were:

1) 2 mm thick black pigmented GMS010 based HDPE-PE300 obtained from Maizey Plastics (Proprietary) Limited, Pretoria, Republic of South Africa 2) 22 mm thick natural colour PP (PP 1022) - also obtained from Maizey Plastics (Proprietary) Limited, Pretoria, Republic of South Africa.

Effect of Degreasing PP Surfaces Prior to Oxyfluorination

Pipe surfaces were cleaned of oil and dust contaminants to facilitate effective activation (by means of oxyfluorination) of the pipe surfaces. Degreasing can be an important step owing to possible contamination of pipe surfaces during pipe production (by extrusion equipment) as well as during the handling of pipes thereafter during transit and storage. Degreasing can also act to remove surface blooms arising from processing additives and performance stabilizers such as antioxidants which can bleed on to pipe surfaces. It should also be noted that, for industrial-scale applications, chemical degreasing can be supplemented or replaced by mechanical degreasing, eg by means of rotating brushes similar to car-wash brushes.

The following experimental conditions were employed:

Evaluation method: Lap shear tests.

Degreasing agent: MEK (methyl ethyle ketone) and TCE (trichloroethylene)

Pipe Material: PP (PPH1022) from Megapipe

Degreasing method: Immersion in degreasing agent at room temperature for 5 minutes was followed by wiping of the surface with degreasing agent-darnpened tissue paper, followed by air drying at ambient conditions.

Drying time before oxyfluorination: Variable between 5 minutes and 24 hours.

Surface Activation: 10 kPa air+40 kPa $F_2/N_2$ mixture comprising 15% $F_2$ by volume for 0.5 hours at 50° C.

PP Surface area to gas volume relation-ship: 300 $cm^2$/2600 $cm^3$.

Hydrolysis technique for oxyfluorinated surface: Immersion immediately after oxyfluorination in demineralised water at room temperature for 18 hours.

Drying of surface after hydrolysis: 24 hours natural air drying at ambient conditions (exposure to ambient air).

Lap shear overlap dimensions: length: 10 mm, width: 26 mm.

Resin: Crystic 392.

Figure 5:
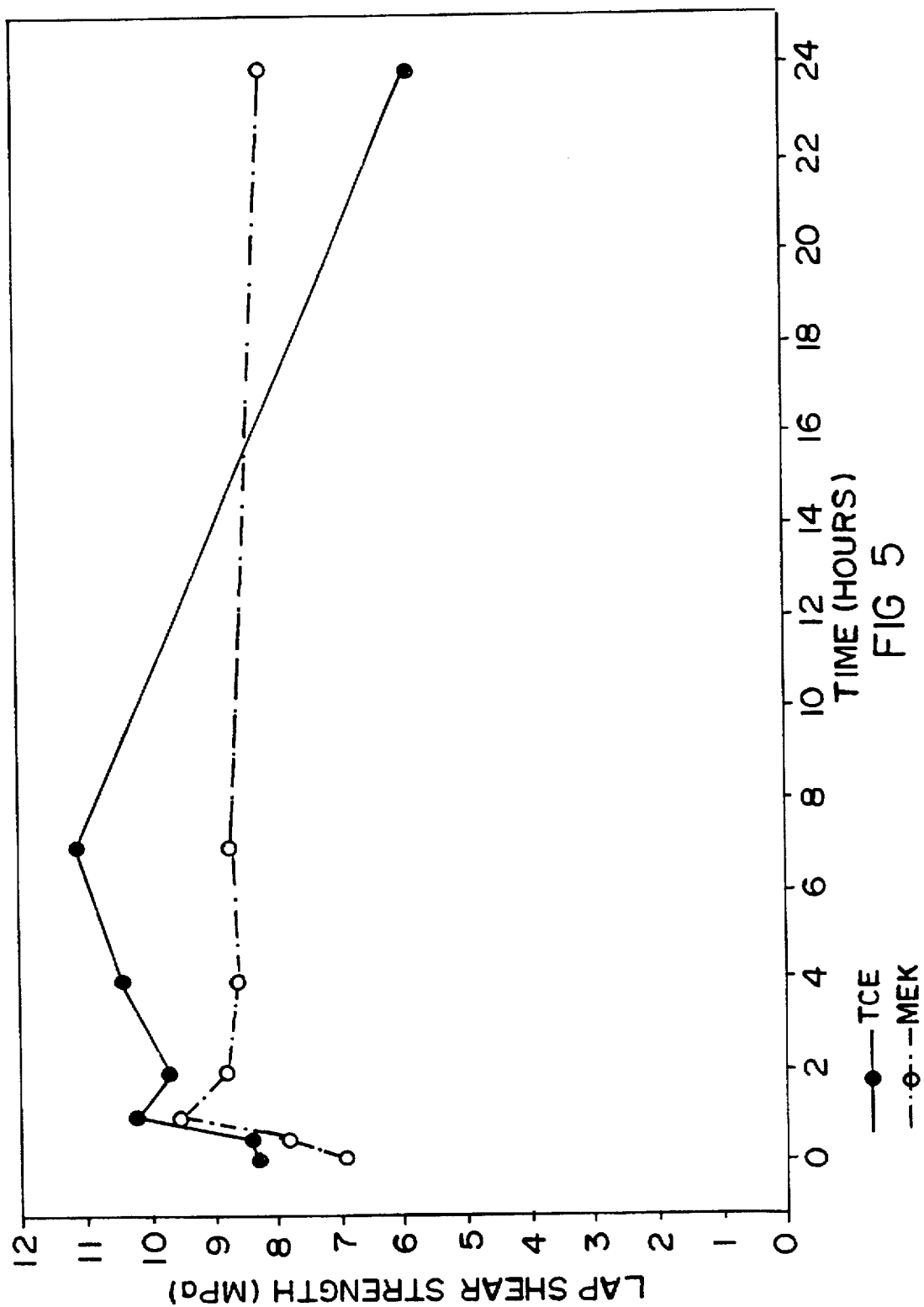
FIG. 5 shows a plot of lap shear strength against pre-oxyfluorination degreasing time for TCE and MEK, the TCE results indicating a predominant platform failure after 10 hours.

The lap shear strengths of the bonds formed as a function of pre-oxyfluorination degreasing time are shown in Table 8 below and in FIG. 5.

TABLE 8

| TIME (hours) | TCE DEGREASING: LAPSHEAR STRENGTH (MPa) | MEK DEGREASING: LAPSHEAR STRENGTH (MPa) |
|---|---|---|
| 0.083 | 8.3 | 6.4 |
| 0.5 | 8.4 | 7.8 |
| 1 | 10.2 | 9.5 |
| 2 | 9.7 | 8.8 |
| 4 | 10.4 | 8.6 |
| 7 | 11.1 | 8.7 |
| 24 | 5.8 | 8.1 |

When TCE was used for degreasing, the tests demonstrated a 60–70% failure rate at the epoxy/PP interface rather than at the polyester/PP interface. From this result and with reference to the results when MEK was used it appears possible that:

a) Excessively thorough degreasing (eg vapour degreasing) with TCE can be disadvantageous when epoxy resin is used.

b) The values shown above when TCE was used represent minimum shear strength values between Crystic 392 polyester and the oxyfluorinated PP surface. The marked decrease in resin strength arising from long drying times (24 hrs) may not necessarily be representative of the polyester/PP resin strength.

Pre-oxyfluorination degreasing with MEK resulted in relatively poor average (8.5 MPa) lap shear strength when compared with using TCE over the complete drying-time range. Substantially similar tests had earlier repeatedly given lap shear strengths in excess of 13 MPa, when oxyfluorinated PP was lightly degreased with TCE at least 3 weeks before oxyfluorinadon. It is believed that the use of other degreasing agents (or even soaps) prior to oxyfluorination, can influence the process in various ways, the influence being dependent on the degreasing agent used as well as on the time interval between degreasing and fluorination/oxyfluorination, and on the regime to which the PP surface is exposed. It should further be noted that degreasing can also in principle be carried out using water-soluble detergents, prior to surface fluorination or oxyfluorination. In small-scale tests Handy Andy household detergent, available in South Africa from Lever Industrial (Proprietary) Limited has been used successfully.

Effect of Varying Oxyfluorination Conditions on Lap Shear Strength of a Polyester-Oxyfluorinated Polyolefin Bond.

Plastics pipe outer surfaces were degreased and cleaned of any contaminants, eg dust etc.

Effect of Oxyfluorination Time and Temperature

The following experimental conditions were employed:

Evolution method: Lap shear tests

Material: PP (PPH 1022) and HDPE (black GM5010 based PE300)

Degreasing agent: TCE

Degreasing method: Surface was wiped with TCE-dampened paper tissue.

Drying time before oxyfluorination: Approximately 3 weeks.

Oxyfluorination:
a) 40 kPa $F_2/O_2$ mixture comprising 20% by volume $F_2$ at 50° C.
b) 40 kPa $F_2/O_2$ mixture comprising 20% by volume $F_2$ at 20° C.

Oxyfluorination time: Variable between 10 seconds and 1 hour.

Polyolefin surface area to gas volume relationship: 300 $cm^2/2600\ cm^3$.

Hydrolysis of oxyfluorinated surface: Immersion immediately after oxyfluorination in demineralised water at room temperature for 18 hours.

Drying of surface after hydrolysis: 24 hours natural air drying at ambient conditions.

Lap shear overlap dimensions: length: 10 mm, width: 26 mm.

Resin: Crystic 392.

Tabulated lap shear strength results for the pipe samples at the two temperatures are shown in Table 9 below.

TABLE 9

| | Lap Shear Strengths (MPa) | | | |
|---|---|---|---|---|
| Oxy-fluorination time (minutes) | PP oxy-fluorinated at 50° C. | PP oxy-fluorinated at 20° C. | HDPE oxyfluorinated at 50° C. | HDPE oxyfluorinated at 20° C. |
| 0.16 | 9.6 | 12.2 | 5.2 | 5.4 |
| 0.5 | 11.2 | 14.8 | 6.7 | 7.9 |
| 1 | 13.5 | 12.2 | 9.1 | 10.1 |
| 4 | 11.05 | 13.8 | 10.6 | 11.5 |
| 10 | 12.4 | 11.6 | 11.1 | 11.5 |
| 20 | 10.7 | 14.5 | 10.1 | 12.6 |

TABLE 9-continued

Lap Shear Strengths (MPa)

| Oxy-fluorination time (minutes) | PP oxy-fluorinated at 50° C. | PP oxy-fluorinated at 20° C. | HDPE oxyfluorinated at 50° C. | HDPE oxyfluorinated at 20° C. |
|---|---|---|---|---|
| 30 | 13.1 | 13.3 | 13.3 | 10.5 |
| 60 | 10.6 | 13.8 | 9.9 | 11.5 |

Figure 6:
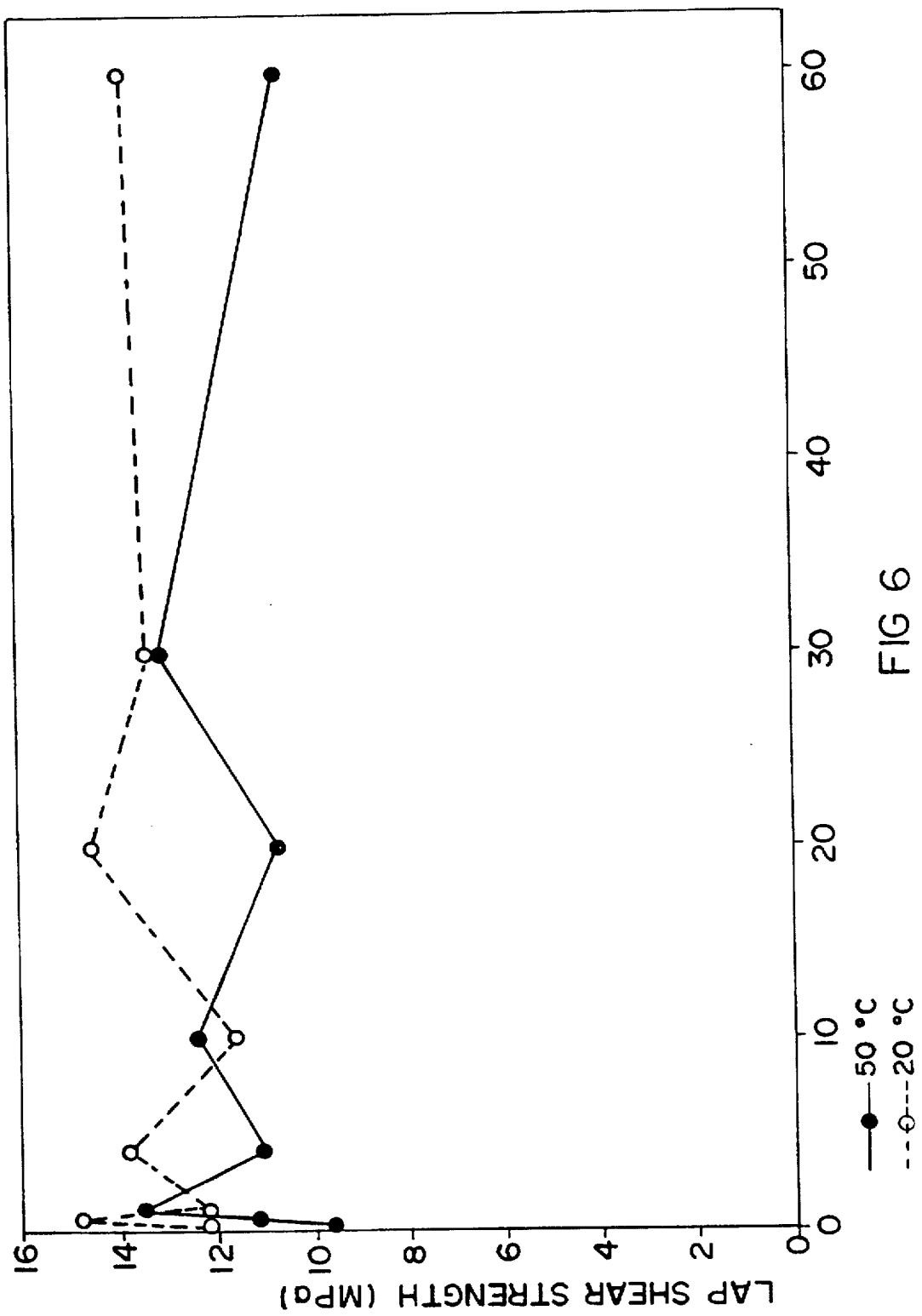
FIG. 6 shows a plot of lap shear strength against oxyfluorination time for PP.
Figure 7:
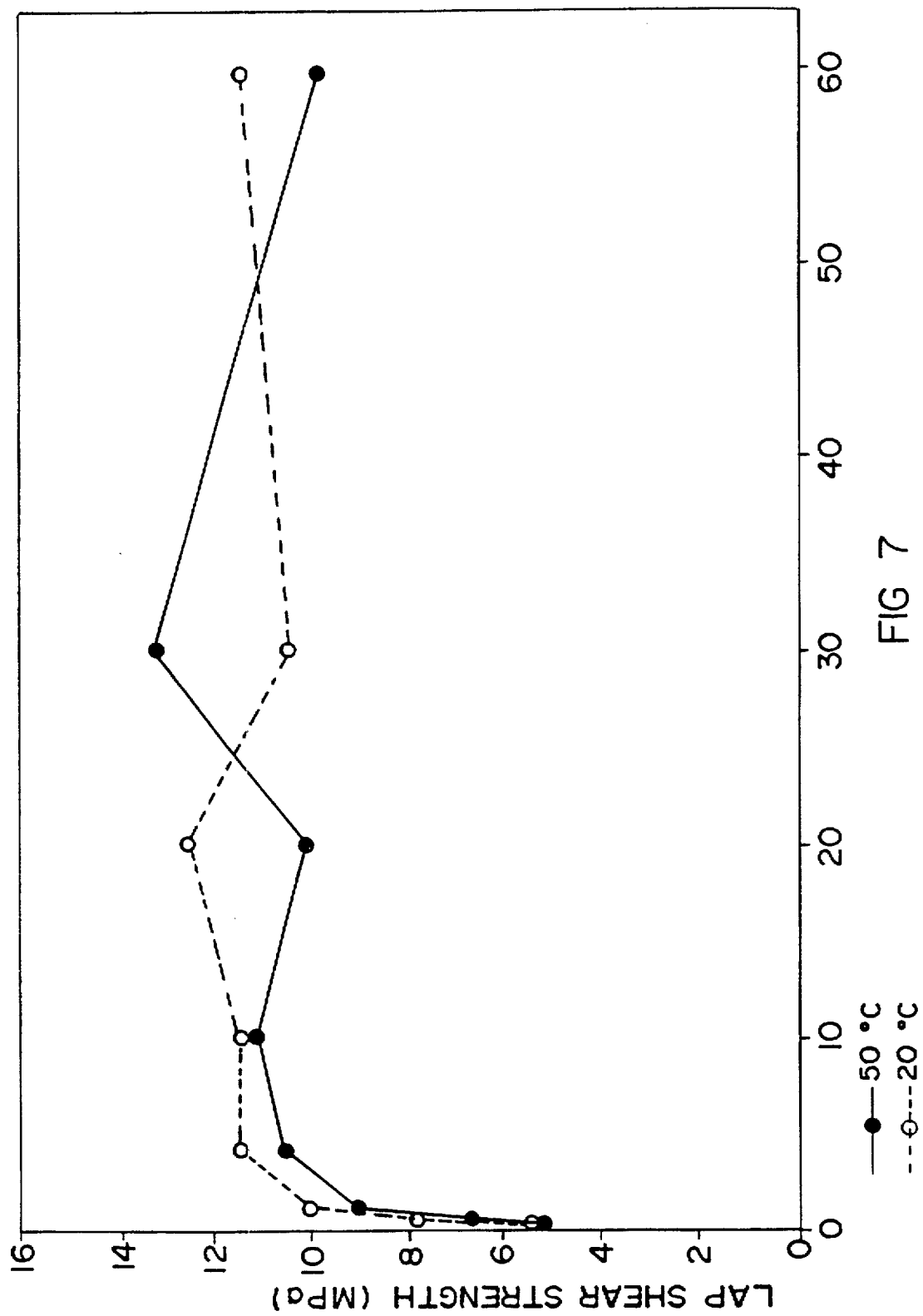
FIG. 7 shows a plot of lap shear strength against oxyfluorination time for HDPE.

The data in Table 9 are illustrated in FIGS. 6 and 7 for PP and HDPE respectively.

The minimum time (independent of the two temperatures investigated) required for sufficient or adequate surface activation of the PP surface at the experimental pressures was less than 5 seconds. Factors that could influence this minimum time possibly include the presence of additives in the PP.

At both temperatures, it is apparent that in the case of black pigmented HDPE (PE300), a minimum time of between 1 and 10 minutes was required sufficiently or adequately to activate the surface.

In the case of both PP and HDPE, these minimum times can be influenced by the $F_2:O_2$ ratio and total pressure used.

Effect of Oxyfluorination Pressure.

The following experimental conditions were employed:

Evaluation method: Lap shear tests.

Material: PP (PPH1022) and HDPE (black GM5010 based PE300).

Degreasing agent: TCE.

Degreasing method: Surface was wiped with TCE-dampened paper tissue.

Drying time before oxyfluorination: Approximately 3 weeks.

Oxyfluorination: A $F_2/O_2$ mixture comprising 20% by volume $F_2$ was used at 50° C. and 20° C. for 0.5 hrs.

Oxyfluorination pressure: Variable between 0.5 kPa and 80 kPa.

Polyolefin Surface area to gas volume relationship: 300 cm²/2600 cm³

Hydrolysis of oxyfluorinated surface: Immersion immediately after oxyfluorination in demineralised water at room temperature for 3 hours.

Drying of surface after hydrolysis: 24 hours natural air drying at ambient conditions.

Lap shear overlap dimensions: length: 10 mm, width: 26 mm.

Resin: Crystic 392.

Tabulated lap shear strength results for the PP and HDPE at the various pressures are shown in Table 10 below.

TABLE 10

| OXYFLUORI-NATION PRESSURE | LAP SHEAR STRENGTH ON PP (MPa) | | LAP SHEAR STRENGTH ON HDPE (MPa) | |
|---|---|---|---|---|
| (kPa) | 50° C. | 20° C. | 50° C. | 20° C. |
| 0.5 | 13.2 | 10.7 | 6.4 | 4.0 |
| 2 | 11.9 | 12.4 | 8.7 | 4.1 |
| 10 | 13.9 | 10.6 | 10.3 | 10.9 |
| 20 | 14.7 | 13.8 | 11.2 | 9.9 |
| 50 | 14.2 | 13.2 | 9.0 | 7.4 |
| 80 | 14.3 | 12.9 | 11.4 | 8.9 |

The shear strength for 50 kPa at 20° C. was possibly unreliable.

Figure 8:
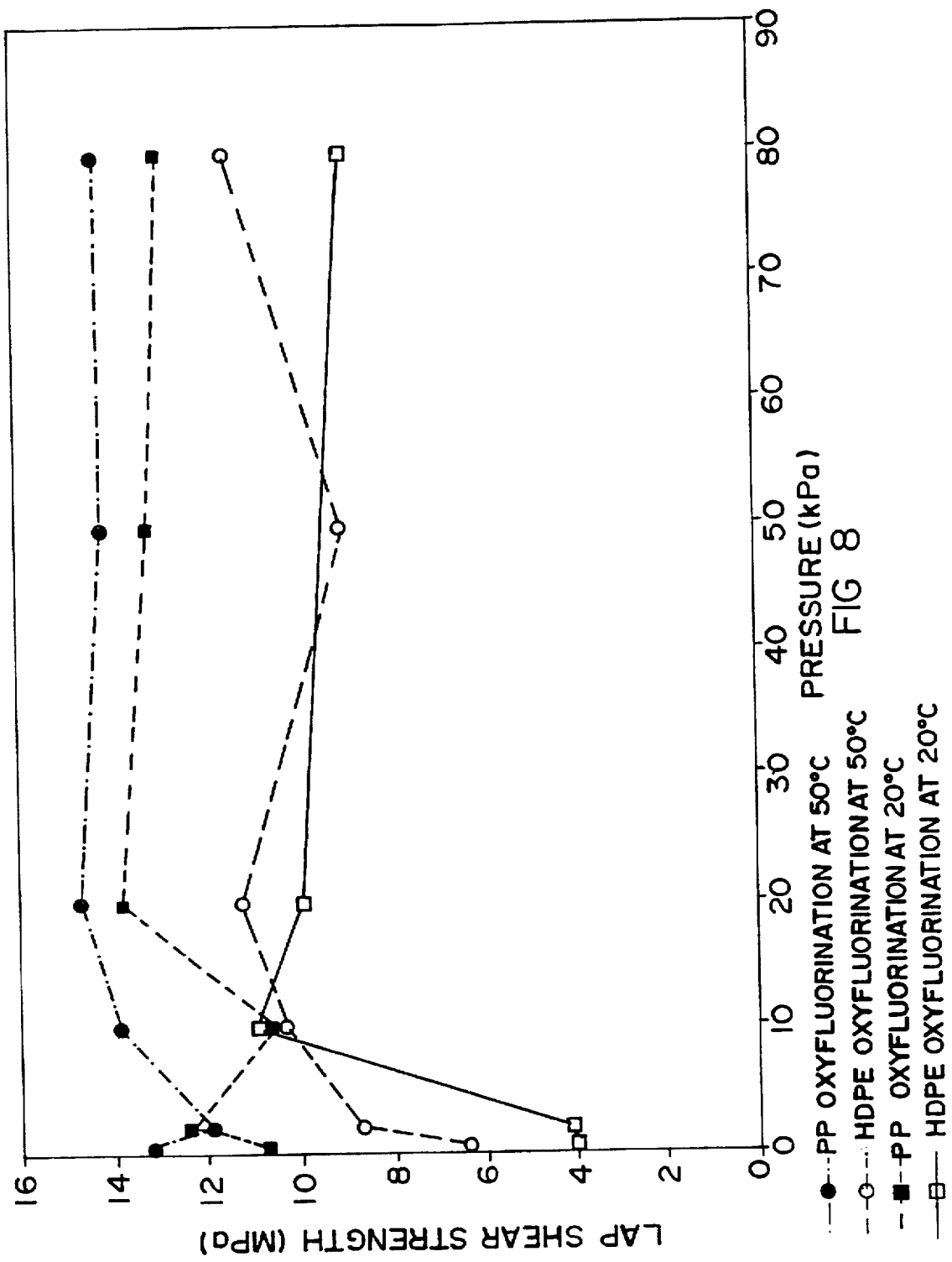
FIG. 8 shows a plot of lap shear strength against oxyfluorination pressure.

The 50° C. results are illustrated in FIG. 8.

PP showed appreciably higher bond strengths than HDPE. It is believed that this is due to the higher reactivity of PP when oxyfluorinated due to its higher number of end groups as well as the fact that the PP is free of black pigment. HDPE appears to require at least 2 kPa at 50° C. and 10 kPa at 20° C. for sufficient or adequate surface activation thereof. It is possible that PP requires less than 0.5 kPa of the $F_2/O_2$ mixture at the experimental conditions for sufficient or adequate surface activation thereof. It thus appears that increases in fluorine ($F_2$) partial pressures are substantially more effective than increases in temperature, to obtain quick activation of the polyolefin surface.

Fluorination Versus Oxyfluorination as Surface Activation Technique for Adhesion Fluorination involves treating plastics pipe surfaces with pure fluorine, or a fluorine and inert gas (eg nitrogen, helium, argon etc) mixture, or a fluorinecontaining gas such as $XeF_2$, $ClF_3$, $BrF_5$, $IF_7$, $CF_4$, $SF_6$ or the like. Oxyfluorination in turn involves surface activation with a gas mixture of which at least two of the components are a fluorine source such as those mentioned above for fluorination, and oxygen (or an oxygen containing gas) respectively, ie at least one fluorine component and at least one oxygen component. In principle both fluorination and oxyfluorination can take place with the reagent gases dissolved in a suitable inert liquid solvent such as a FREON which is contacted with the polyolefin surface.

The following experimental conditions were employed:

Evaluation method: Lap shear tests.

Material: HDPE (black GM5010 based PE300).

Degreasing agent: TCE.

Degreasing method: Pipe surfaces were wiped with TCE-dampened paper tissue.

Drying time before oxyfluorination and fluorination: Two days.

Oxyfluorination conditions: 50° C. for 0.5 hrs.

Oxyfluorination pressure: 10 kPa air+20 kPa $F_2/O_2$ mixture comprising 20% by volume $F_2$.

Fluorination conditions: 50° C. for approximately 3 hrs.

Fluorination pressure: A $F_2/N_2$ mixture comprising 20% by volume $F_2$ was used at a pressure sufficient to give the surface a fluorine mass loading of 60µg/cm² after fluorination.

Hydrolysis of activated surface: Hydrolysis by exposure to moisture in ambient air for longer than 2 months.

Lap shear overlap dimensions length: 15 mm, width: 26 mm.

Resins: Crystic 392, Crystic 600, N7384PA, Dion 9100.

Figure 9:
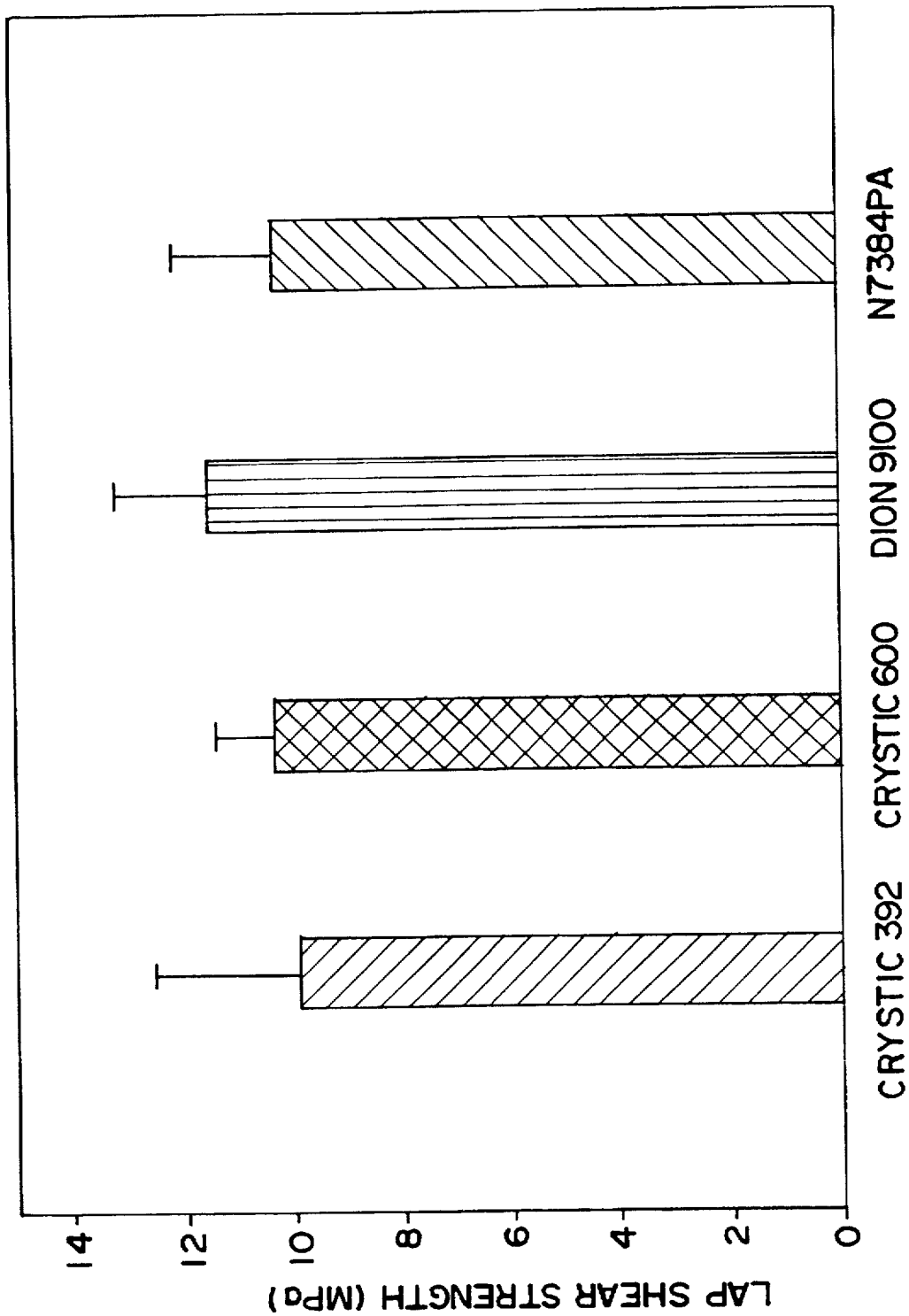
FIG. 9 shows a plot of lap shear strength for each of the resin materials when TCE is used as a degreasing agent and oxyfluorination is employed.
Figure 10:
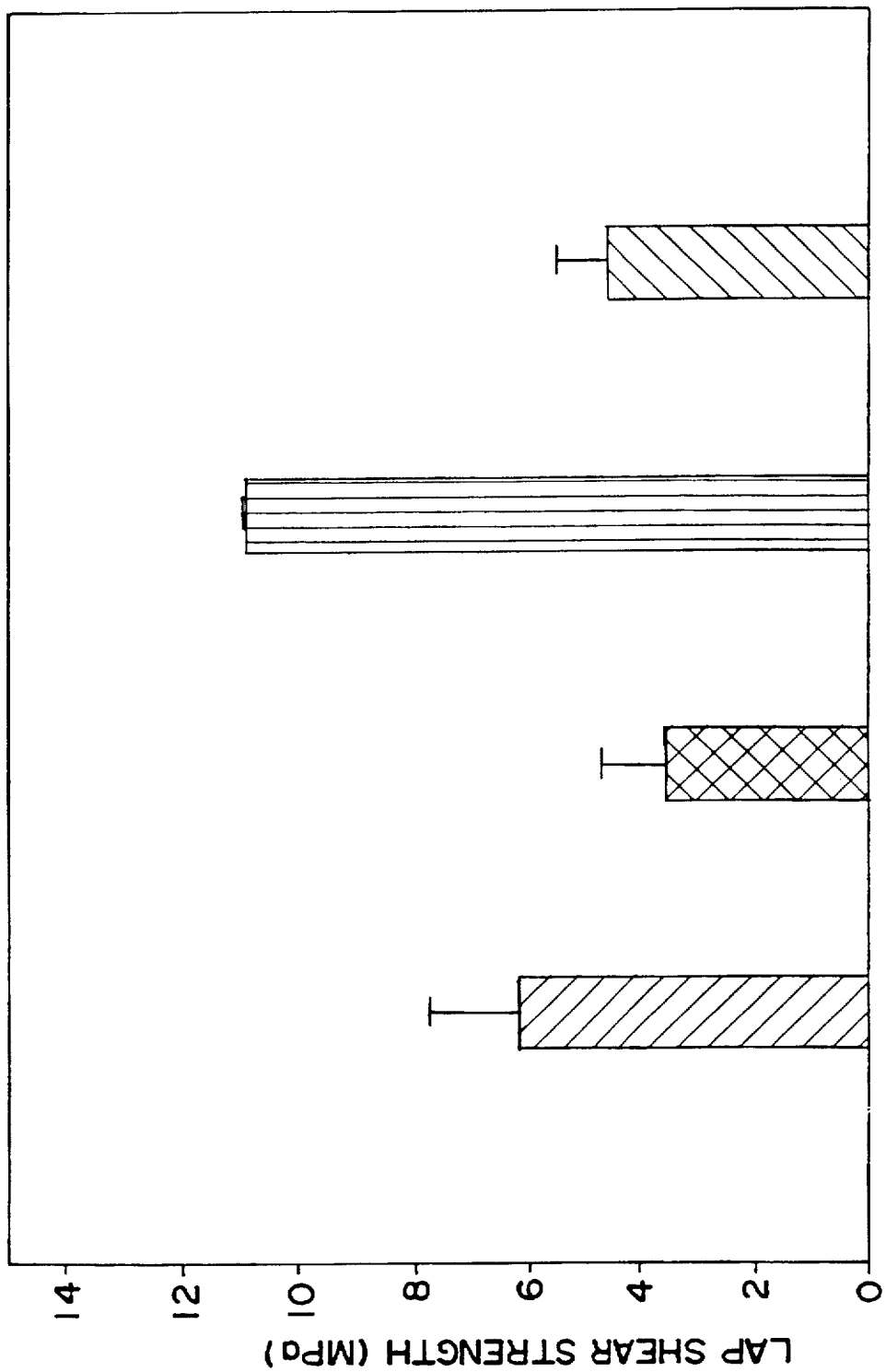
FIG. 10 shows a plot of lap shear strength for each of the resin materials when TCE is used as a degreasing agent and fluorination is employed.

The results demonstrating differences in resin adhesive strength for the two activation techniques (fluorination and oxyfluorination) are shown in Table 11 below and are illustrated in FIG. 9 (oxyfluorination) and FIG. 10 (fluorination).

TABLE 11

| Resin | Oxyfluorinated substrate Lap shear strength (MPa) | Fluorinated substrate Lap shear strength (MPa) |
|---|---|---|
| Crystic 392 | 9.9 | 6.1 |
| Crystic 600 | 10.4 | 3.5 |
| Dion 9100 | 11.6 | 10.9 |
| N7384PA | 10.4 | 4.6 |

Oxyfluorination resulted in higher lap shear resin adhesive strengths with a broader range of resins when compared to fluorination. With certain resins, (eg Dion 9100), a fluorinated surface was shown to be capable of providing resin adhesive strengths comparable with those of an oxyfluorinated surface.

Effect of Hydrolysis Conditions on Lap Shear Strength

Immediately after oxyfluorination an activated polyolefin surface undergoes a hydrolysis reaction when brought into contact with atmospheric air. During this hydrolysis, the surface is chemically unstable and generally unsuitable for the application of resin. Accelerated hydrolysis is thus desirable.

Determination of the Optimum Hydrolysis Medium

The following experimental conditions were employed:

Evaluation method: Lap shear tests.
Material: PP (PPH1022) and HDPE (black GM5010 based PE300).
Degreasing agent: TCE.
Degreasing method: Surface was wiped with TCE-dampened paper tissue.
Drying time before oxyfluorination: Approximately 3 weeks.
Oxyfluorination conditions: 40kPa $F_2/O_2$ mixture comprising 20% by volume $F_2$ at 50° C. for 0.5 hrs.
Polyolefin surface area to gas volume relationship: 300 $cm^2/2600$ $cm^3$
Hydrolysis of activated surface: Immersion immediately after oxyfluorination in hydrolysis medium.
Hydrolysis mediums investigated at 20° C.:
  0.5M aqueous NaOH solution for 120 minutes.
  0.5M aqueous HCl solution for 120 minutes.
  Demineralised water for 120 minutes.
  Atmospheric water vapour for 69 hrs.
Drying of surface after hydrolysis: 24 hours natural air drying at ambient conditions.
Lap shear overlap dimensions: length: 10 mm, width: 26 mm.
Resin: Crystic 392.

Tabulated lap shear strength results for the PP and DHPE and hydrolysis media are shown in Table 12 below.

TABLE 12

| Hydrolysis medium | Lap shear strength on PP (MPa) | Lap shear strength on HDPE (MPa) |
|---|---|---|
| Air | 12.8 | 8.0 |
| $H_2O$ | 12.5 | 8.2 |
| HCl | 11.6 | 9.2 |
| NaOH | 11.8 | 7.9 |

In the case of PP, air and water hydrolysis gave slightly higher bond strengths with Crystic 392, while in the case of HDPE, water and HCl gave marginally higher values. From a practical point of view, it appears that water would be the preferred choice of hydrolysis medium. Practical issues include cost, ease of handling and time required for substantially full hydrolysis of the surface. Water effected substantially full hydrolysis in less than 3 hours compared to air hydrolysis which required up to 120 hours.

Determination of Minimum Hydrolysis Times for Different Hydrolysing Media

A freshly activated surface typically contains acyl fluoride chemical functional groups that undergo hydrolysis. During hydrolysis the activated surface is regarded as being unstable. PP and HDPE surfaces were oxyfluorinated with 100 kPa $F_2/O_2$ mixture comprising 20% by volume $F_2$ at 50° C. for 16 hours. A decrease in infrared peak intensity of the acyl fluoride functional groups on the surface was monitored as a function of exposure time in the hydrolysation medium. For this purpose a Fourier transform infrared-photoacoustic spectrum (FTIR-PAS) technique was used as a quantifying technique. The hydrolysing media used were 0.05M solutions of HCl and NaOH, as well as pure demineralised water and ambient air.

Figure 11:
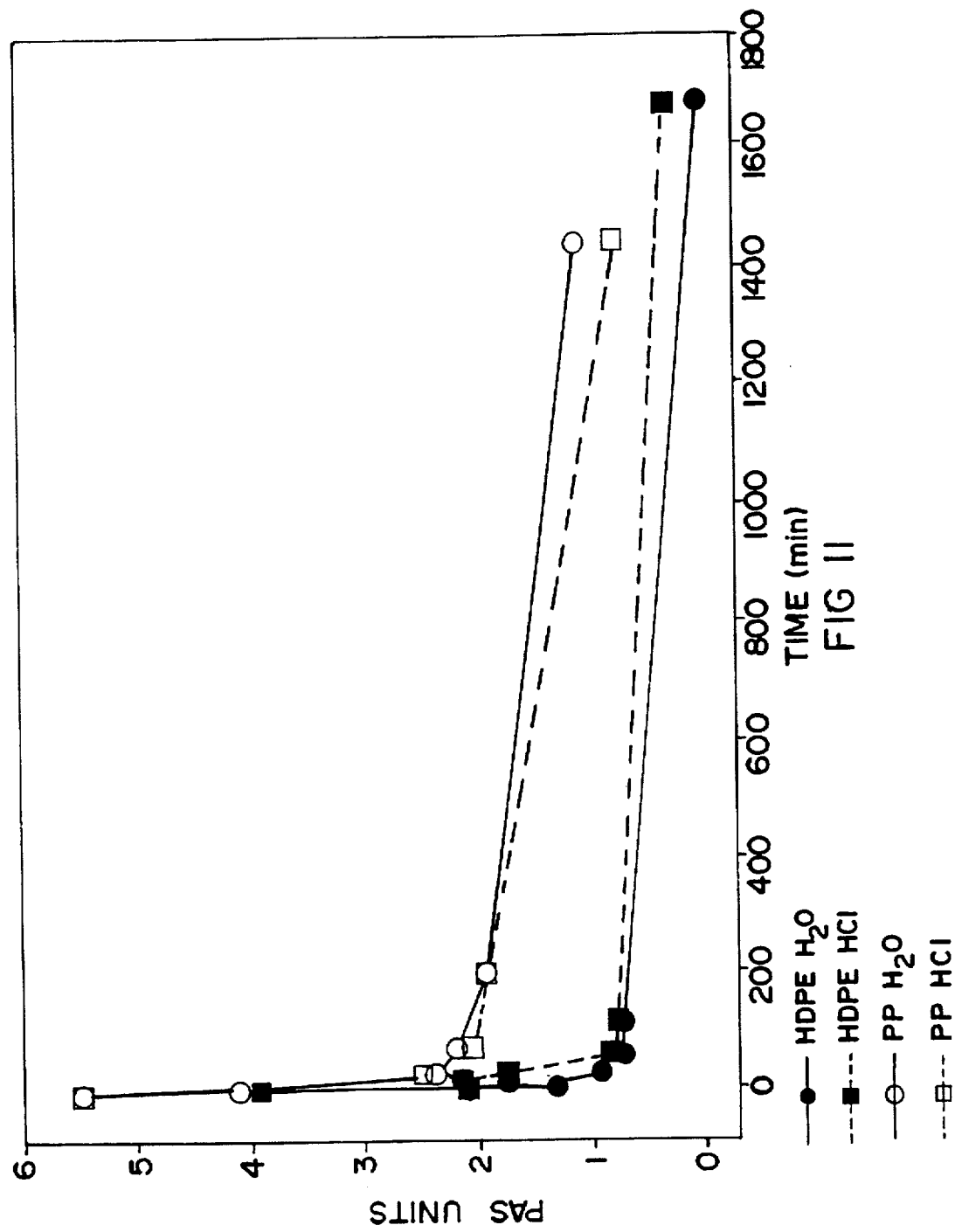
FIG. 11 shows a plot of PAS units against hydrolysis time of HDPE and PP (IR peak=1848 $cm^{-1}$, baseline 2000-1532 $cm^{-1}$)
Figure 12:
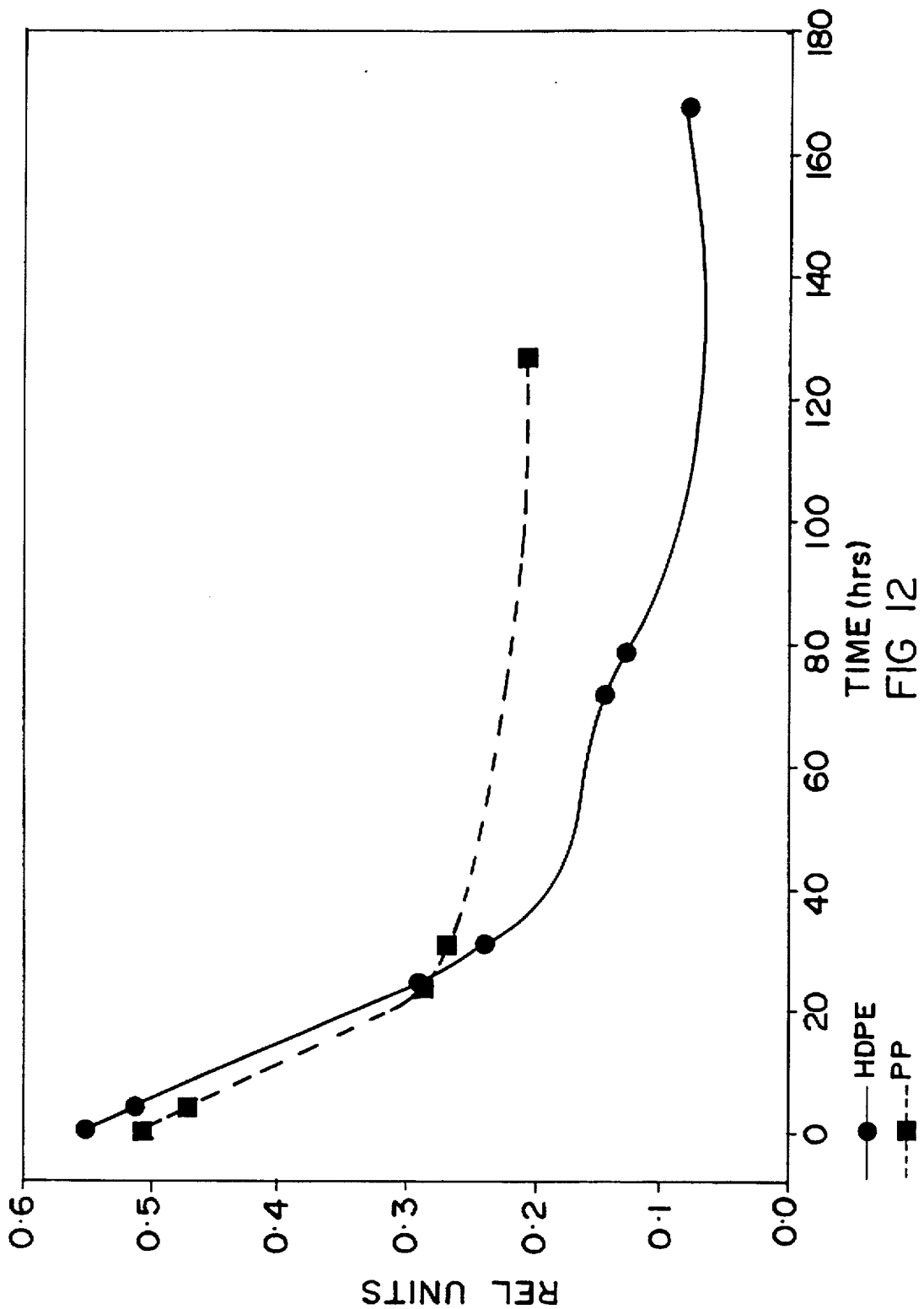
FIG. 12 shows a plot of relative PAS peak heights (REL) units against hydrolysis time of HDPE and PP in air (IR peak=1844 $cm^{-1}$, base line 2000-1532 $cm^{-1}$.
Figure 13:
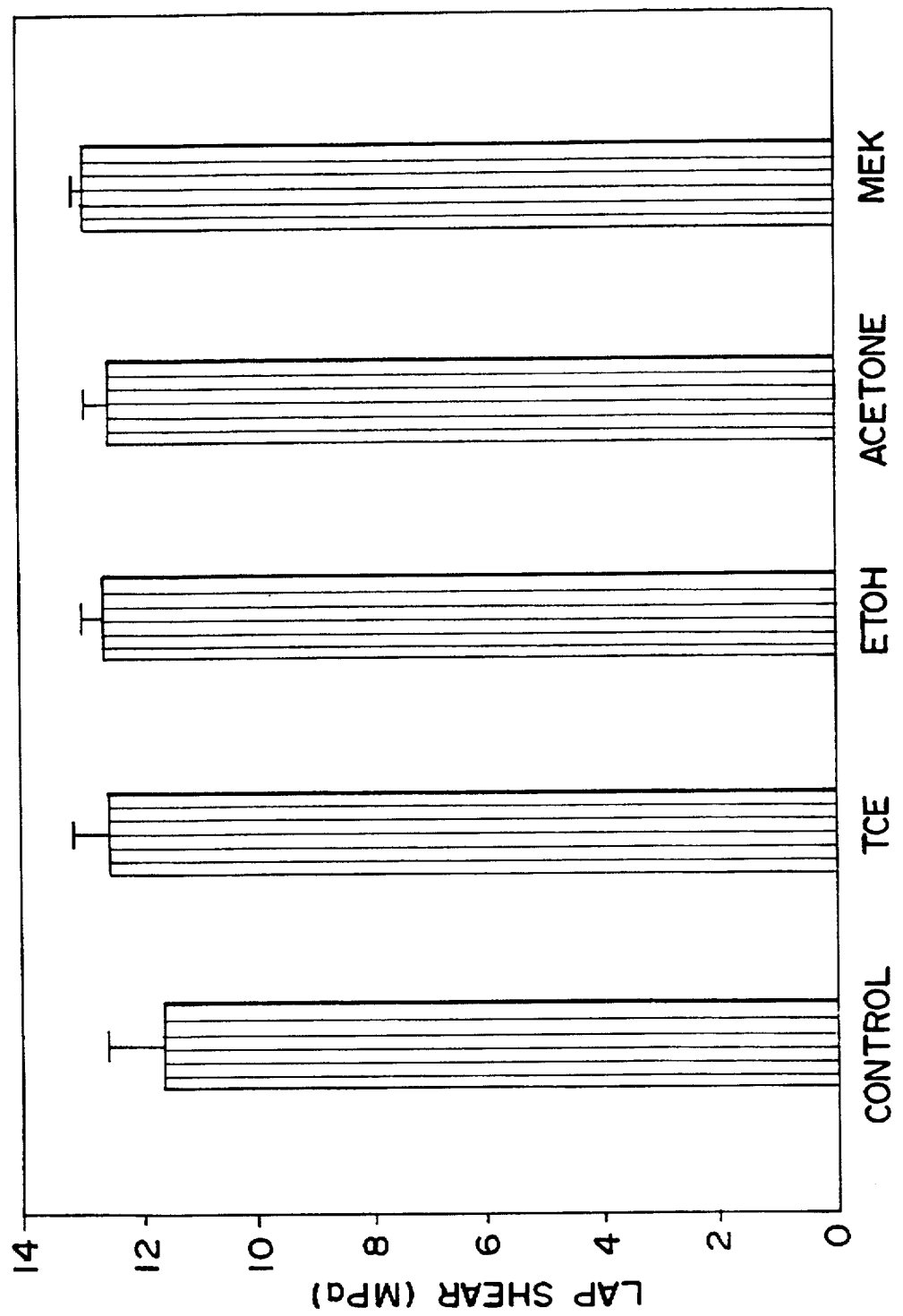
FIG. 13 shows lap shear strengths for various degreasing agents when oxyfluorinated PP is employed and the resin is CRYSTIC 392.
Figure 14:
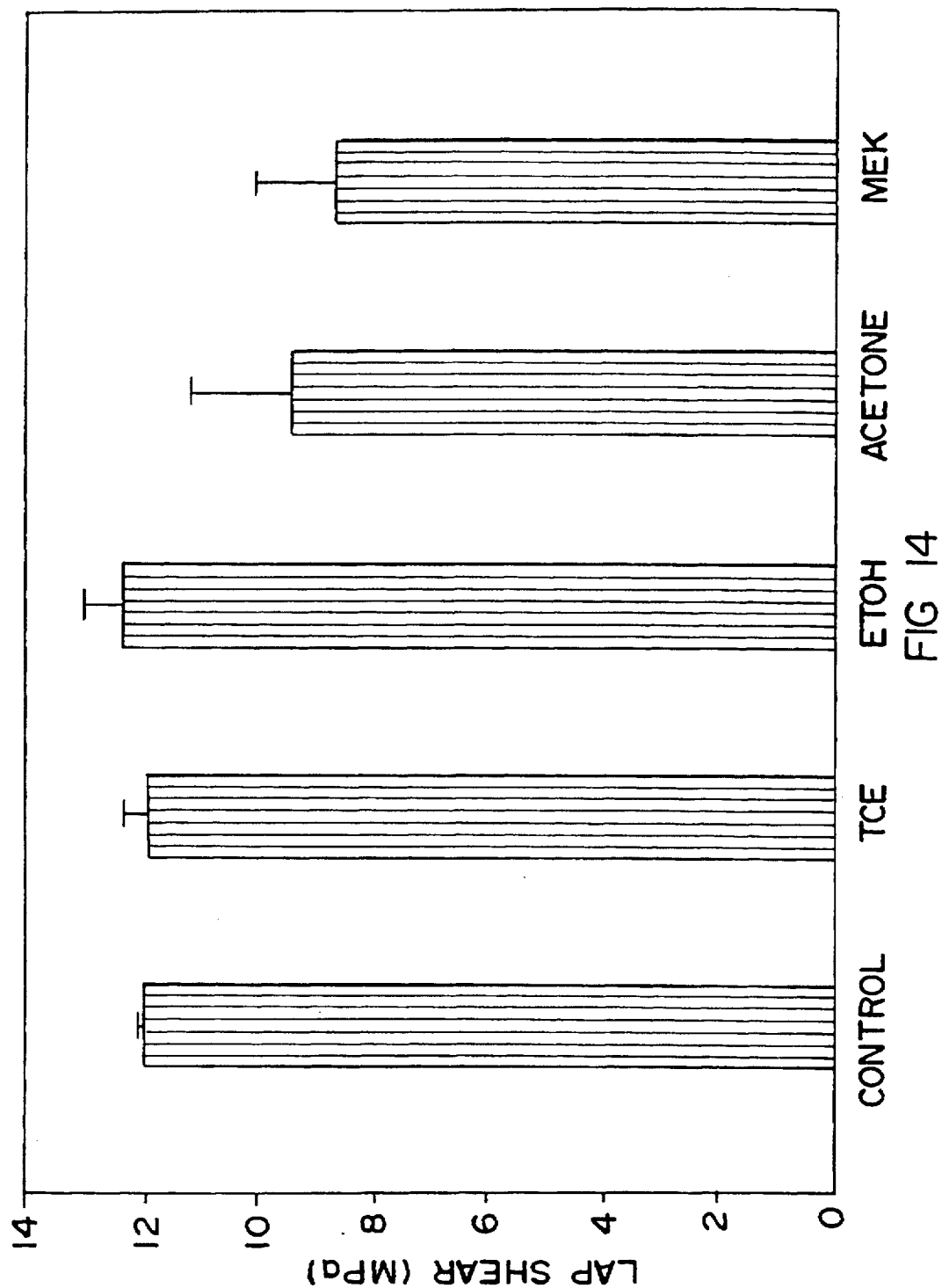
FIG. 14 shows lap shear strengths for various degreasing agents when oxyfluorinated PP is employed and the resin is CFRYSTIC 600.
Figure 15:
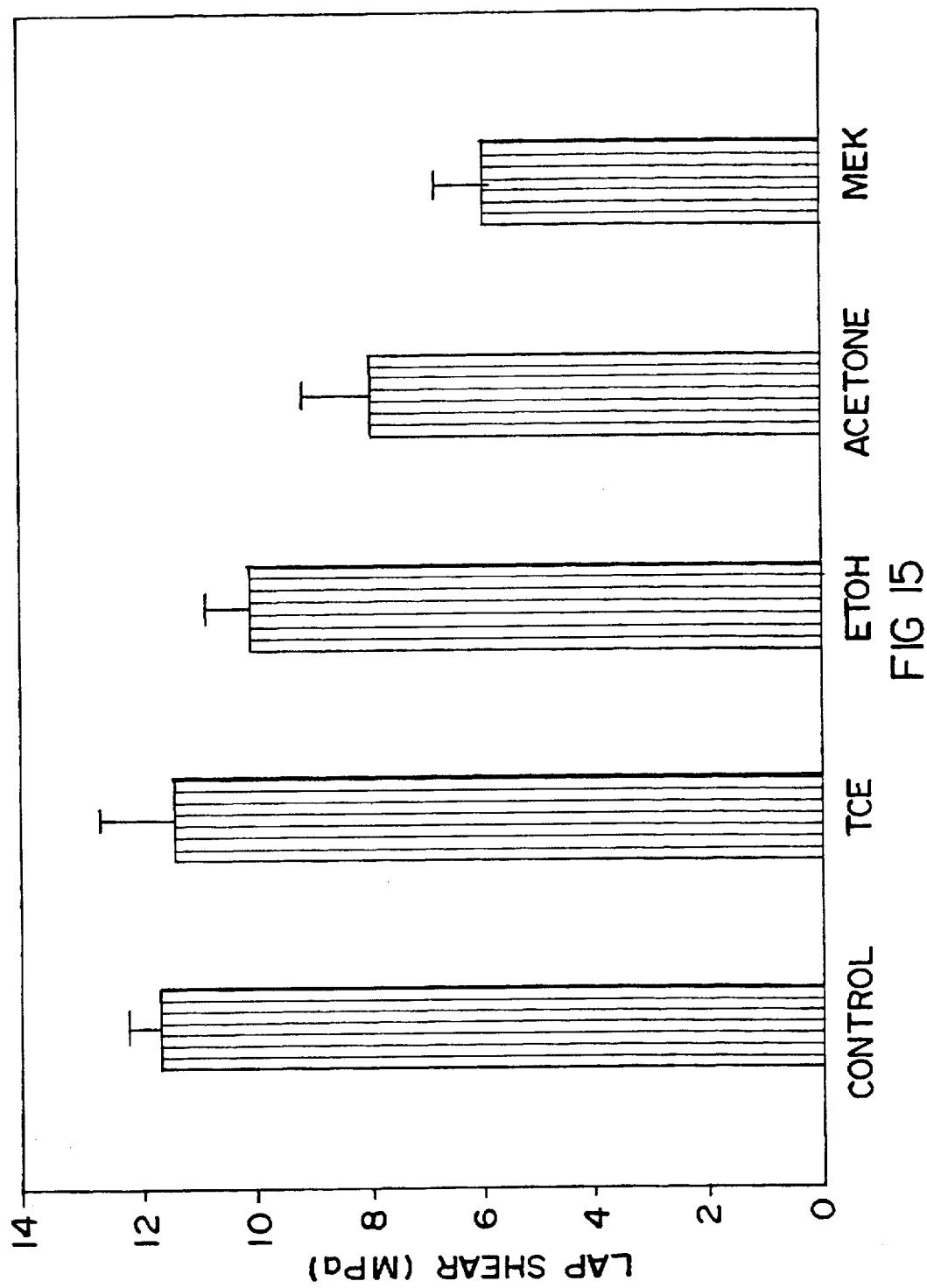
FIG. 15 shows lap shear strengths for various degreasing agents when oxyfluorinated PP is employed and the resin is DION 9100.
Figure 16:
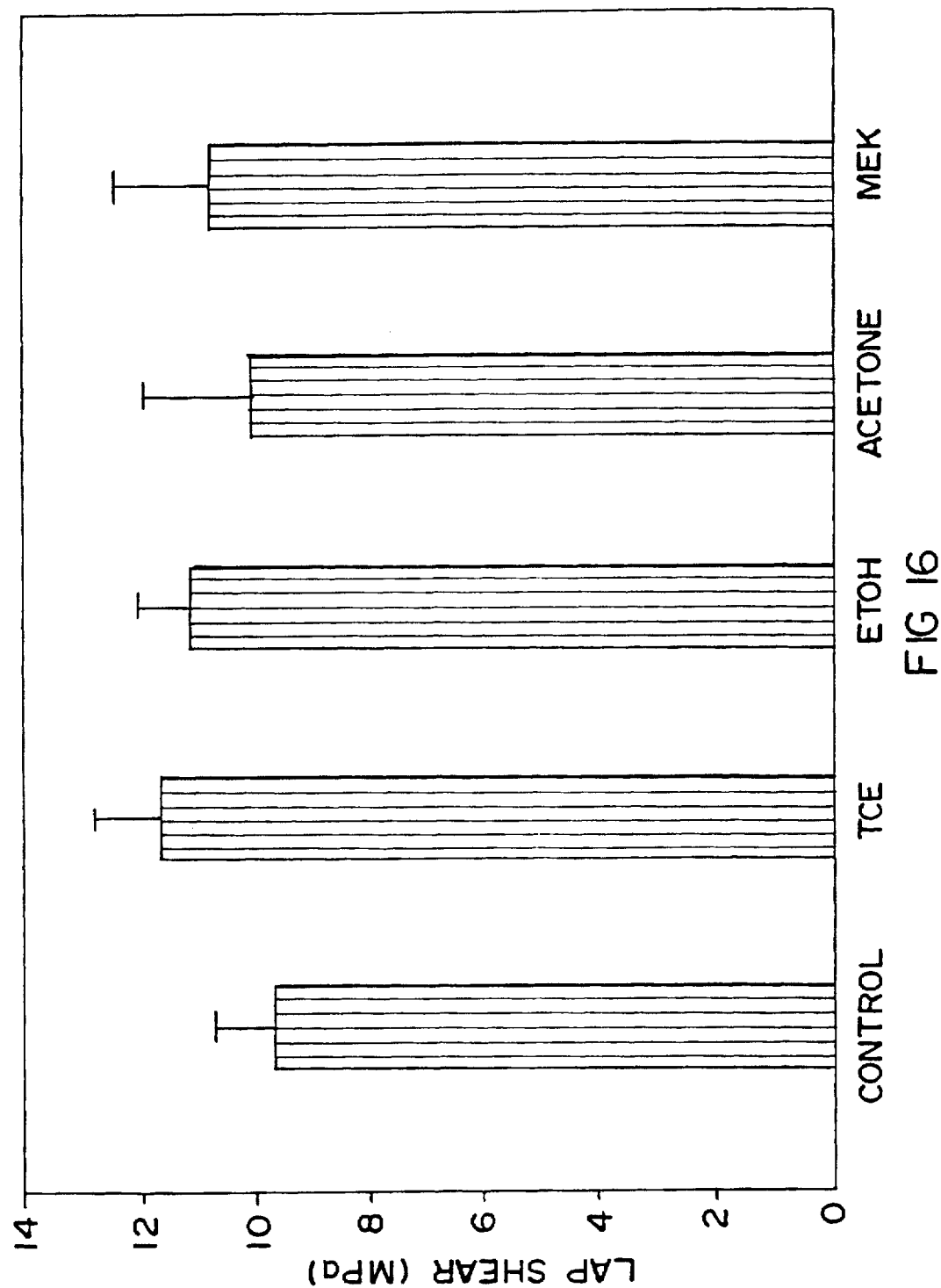
FIG. 16 shows lap shear strengths for various degreasing agents when oxyfluorinated PP is employed and the resin is N7384PA.

The results for HCl and water hydrolysis on PP and HDPE surfaces are shown in FIG. 11. The results for air hydrolysis are shown in FIG. 12. The aqueous hydrolysis medium results are tabulated in Table 13, and normalised FTIR-PAS peak heights (1844 wrt±3000 $cm^{-1}$), corresponding to air hydrolysis, are shown in Table 14. No data were obtained for NaOH since immersion in this hydrolysing medium resulted in an immediate drastic reduction in IR band intensities.

TABLE 13

| | FTIR-PAS peak heights at 1844 $cm^{-1}$ | | | |
|---|---|---|---|---|
| Time (min) | Oxyfluorinated PP in HCl solution | Oxyfluorinated PP in water | Oxyfluorinated HDPE in HCl solution | Oxyfluorinated HDPE in water |
| 0 | 5.5 | 5.5 | 3.9 | 3.9 |
| 5 | 3.9 | 4.1 | — | — |
| 6 | — | — | 2.1 | 1.4 |
| 15 | — | — | 2.1 | 1.3 |
| 25 | 2.5 | 2.4 | — | — |
| 30 | — | — | 1.7 | 0.9 |
| 60 | — | — | 0.8 | 0.7 |
| 72 | 2.1 | 2.2 | — | — |
| 120 | — | — | 0.8 | 0.7 |
| 200 | — | 1.9 | — | — |
| 1440 | 0.8 | 1.1 | — | — |
| 1680 | — | — | 0.32 | 0.02 |

TABLE 14

| Normalised FTIR-PAS peak heights at 1844 cm$^{-1}$ | | |
|---|---|---|
| Time (hrs) | Oxyfluorinated HDPE | Oxyfluorinated PP |
| 0 | 0.55 | 0.5 |
| 4 | 0.51 | 0.47 |
| 24 | 0.39 | 0.29 |
| 31 | 0.24 | 0.27 |
| 72 | 0.14 | 0.20 |
| 79 | 0.13 | — |
| 168 | 0.08 | — |

FTIR-PAS has a substrate penetration depth of approximately 20 microns (μm) in the frequency domain of the acyl fluoride absorption band. It is believed that adhesion primarily involves the outer 1 nm depth of material under the oxyfluorinated surface, and that the times required to achieve stabilisation in the above results represent the times required to achieve maximum hydrolysation in the respective media. For oxyfluorinated PP and HDPE, water and HCl each hydrolysis took less than 3 hrs, and in the case of air, hydrolysis took less than 120 hrs.

Determination of the Optimum Drying Time with Water as Hydrolysis Medium

After hydrolysis in either an aqueous HCl solution or in water, the surface of a component should be dried before the application of the resin can take place. After HCl-medium hydrolysis the surface should be rinsed with water to remove any residual acid thereon, before drying.

The following experimental conditions were employed:

Evaluation method: Lap shear tests.

Material: PP (PPH1022).

Degreasing agent: TCE.

Degreasing method: Surface was wiped with TCE-dampened paper tissue.

Drying time before oxyfluorination: Approximately 3 weeks.

Oxyfluorination: 40 kPa $F_2/O_2$ mixture comprising 20% by volume $F_2$ at 50° C. for 0.5 hrs.

Polyolefin surface area to gas volume relationship: 300 cm$^2$/2600 cm$^3$

Hydrolysis of activated surface: Immersion immediately after oxyfluorination in hydrolysis medium at room temperature for 18 hrs.

Hydrolysis medium: Demineralised water

Drying time of surface after hydrolysis: Variable between 5 minutes and 24 hrs.

Lap shear overlap dimensions: length: 10 mm, width: 26 mm.

Resin: Crystic 392.

It Is believed that the epoxy resin used to join the shear test sheets to the backing plates is adversely affected or influenced by a wet surface. The backing plates were therefore first joined to the sheets in usual fashion before tests were conducted. Different drying times were then simulated by wetting the surface with a water-dampened tissue and then allowing various times to elapse before the polyester resin was applied to the test surfaces.

Table 15 below demonstrates the effect of varying post-hydrolysis drying times of the surface before application of the polyester resin.

TABLE 15

| Drying time (hours) | Lap shear strength (MPa) |
|---|---|
| 0.25 | 10.1 |
| 1 | 9.4 |
| 3 | 9.0 |
| 6 | 14.5 |

Given the inherent scatter in results characteristic of the lap shear test method, the values obtained in the time interval between and including 0.25 to 3 hours do not represent a significant trend. The improvement at 6 hours, however, indicates improved adhesion. Drying times, at ambient conditions, in excess of 3 hours, are thus desirable after hydrolysis, in order to achieve optimum adhesion. However, drying times less than 3 hours showed adhesion which was not unacceptable. Because ambient conditions change from day to day, as well as with seasons and location, the above results are expected to vary, within limits.

Comparison Between Commercially Available Fleece-Backed PP Sheeting and Oxyfluorinated PP Sheeting in Terms of Lap Shear Strength Using a Polyester Reson So-called fleece-backed PP sheeting is typically used to manufacture large container reservoirs in industry.

Due to low wettabilities, low surface energies induced by low polarities and low interactions across interfaces, polyolefins generally do not have good adhesion properties. To facilitate use of polypropylene in adhesion applications, a polyester fleecing is attached to the polypropylene. The polyester fleecing improves the wettability of the surface and provides mechanical interlocking sites for the resin used for the adhesion. The main application of fleecing is in the manufacture of large storage tanks (fleecing on the outside), eg to store aggressive or corrosive chemicals. The tanks are then reinforced with polyester resin-impregnated glass fibre. This construction technique provides the user with a strong storage tank that is resistant to various chemicals.

MATERIALS USED a) Commercially available polypropylene:- Trovidur PP 7032 (Grey) obtained in South Africa from Intematio (Proprietary) Limited, Krugersdorp.

b) Commercially available polypropylene (Amparglas):- PPH 1022 (Natural) obtained from Ampaglas South Africa (Proprietary) Limited.

c) Commercially available fleece-backed polypropylene:- Trovidur PPN 7032 obtained from intematio (Proprietary) Limited.

The following experimental conditions were employed:

The various polypropylene surfaces were degreased with TCE and allowed to dry.

Fluorination Conditions of Non-fleeced Materials:

a) Gas Mixture: 10 kPa Air, 10 kPa $N_2$, 30 kPa $F_2/N_2$ mixture comprising 15.8% by volume $F_2$ b) Fluorination Temperature: 50° C.

c) Fluorination Time: 30 minutes

Hydrolysis Conditions:- 1 week exposure to moisture in ambient air

Resins Used:- Crystic 600 and Crystic 392

Evaluation Method:- Lap Shear Tests

Silicone sealant was used as a masking agent on the fleece-backed samples since the polyester fleecing absorbed the polyester resins thereby making testing very difficult.

The silicone sealant prevented absorption of the polyester resin and did not adhere to the resins tested. A laminate was then made using polyester resin and three layers of surface tissue made from non-woven glass fibre veil material, to form an unmasked shear area of 312 mm² (26 mm width×12 mm length). The various laminates were then tested.

The lap shear results for the various grades of polypropylene are set out in Table 16 below.

TABLE 16

Lap shear results obtained for polypropylene

| | Lap Shear Strength (MPa) | | | | | |
|---|---|---|---|---|---|---|
| | Trovidur PP/V 7032 | | Trovidur PP 7032 | | PPH 1022 | |
| Sample Number | Crystic 600 | Crystic 392 | Crystic 600 | Crystic 392 | Crystic 600 | Crystic 392 |
| 1 | 8.244 | 4.144 | 12.12 Substrate | 10.61 | 9.113 | 14.20 |
| 2 | 7.766 | 3.885 | 11.45 Substrate | 9.153 | 12.00 | 11.89 |
| 3 | 9.769 | 3.958 | 8.413 | 7.112 | 13.03 | 11.32 |
| 4 | 6.913 | 4.282 | Platform Failure | Poor Glue-line | 10.25 | 12.56 |
| 5 | Platform Failure | Platform Failure | Platform Failure | Poor Glue-line | Platform Failure | Poor Glue-line |
| Average | 8.173 | 4.067 | 10.66 | 8.959 | 11.10 | 12.49 |

Based on the above laps shear strength results it is evident that by using fluorine surface-treated PPH 1022 material optimum cost (as the PPH 1022 material is the least expensive) and performance benefits can be obtained.

Further push-out tests of the general type described above, with reference to Tables 1–7 and FIGS. 1–4 were carried out, and are described in Examples 1–6 hereunder. The tests in Examples 1–6 were carried out some months after the tests illustrated in Tables 1–7, with a better understanding of the invention, and led to improved results.

The invention will now be described, by way of non-limiting illustrative example, with reference to the following Examples 4–6, and with reference to the accompanying Tables 17–21.

In the Tables:

Table 17 shows shear strengths (MPa) against sample number for polypropylene pipe samples having a reinforced polyester resin-impregnated glass fibrous material applied by filament winding according to the process of the invention, with reference to the required shear strength according to British Standard B.S. 6464;

Table 18 shows shear strengths (MPa) against sample number for polypropylene pipe samples having a reinforcement of polyester resin-impregnated glass fibrous material applied by tape wrapping according to the process of the invention, with reference to the required shear strength according to British Standard B.S. 6464;

Table 19 shows shear strengths (MPa) against sample number for polypropylene and high density polyethylene pipe samples having a reinforcement of polyester resin-impregnated glass fibrous material applied by tape wrapping according to the process of the invention, with reference to the required shear strength according to British Standard B.S. 6464;

Table 20 shows shear strengths (MPa) against sample number for high density polyethylene pipe samples having a reinforcement of polyester resin-impregnated fibrous material applied by tape wrapping according to the invention, with reference to the required shear strength according to British Standard B.S. 6464;

Table 21 shows shear strengths (MPa) against sample number for polypropylene pipe samples having a reinforcement of polyester resin-impregnated fibrous material applied by hand lamination according to the invention, with reference to the required shear strength according to British Standard B.S. 6464; and Table 22 shows shear strengths (MPa) against sample number for high density polyethylene pipe samples having a reinforcement of epoxy resin-impregnated fibrous material applied by filament winding according to the invention, with reference to the required shear strength according to British Standard B.S. 6464.

The fluorination of the pipes was carried out batchwise in an 11 m³ mild steel reactor. Pipes were placed in the reactor and the reactor was evacuated to an absolute pressure of 10 kPa. Then a $F_2/N_2$ mixture comprising 20% by volume $F_2$ was bled into the reactor to a total pressure of 30 kPa. The fluorination was carried out at room temperature for 30 minutes, after which the reactor was evacuated and the pipes removed.

For Example 1, six polypropylene pipes were used. The polypropylene material was PPH2222. The pipes were all 110 mm OD Class 10 piping having a wall thickness of 8.5 mm. None of the pipes was degreased before fluorination. Pipe numbers PP 1–PP4 were degreased with MEK and pipe numbers PP5 and PP6 were degreased with acetone after fluorination and before reinforcement was applied. The reinforcing technique used was filament winding. The primary aim of Example 1 was to evaluate resins for adhesion of fibrous reinforcing to the pipes. On all the pipes this resin was left to gel before the layers of resin-impregnated reinforcement were applied.

For Example 2, four polypropylene pipes were used. The polypropylene material was PPH2222. The pipes were all 90 mm OD Class 10 piping having a wall thickness of 7.0 mm. None of the pipes was clegreased before fluorination. All the pipes were degreased with MEK after fluorination and before reinforcement was applied. The reinforcing technique used was tape wrapping. The primary aim of Example 2 was to do repeatability tests on CRYSTIC 600 as a resin for adhesion of reinforcement to the pipes. This resin was left to gel before layers of the resin-impregnated fibrous reinforcement were applied.

For Example 3, four polypropylene and four high density polyethylene pipes were used, whose polypropylene material and polyethylene material were respectively PPH2222 and GM5010. The polypropylene pipes were all 110 mm OD class 10 piping having a wall thickness of 8.5 nm. All the polypropylene pipes were degreased with MEK before fluorination. Of the polypropylene pipes, pipe numbers PP 1 and PP2 were degreased with MEK (and pipe numbers PP3 and PP4 were not degreased), after fluorination and beft)re the resin-impregnated fibrous reinforcement was applied. Similar degreasing was applied to the high density polyethylene pipes. The reinforcing technique was tape wrapping. The primary aim of Example 3 was to do repeatability tests on CRYSTIC 600 as the resin for adhesion of the fibrous reinforcement to the pipes, to evaluate degreasing (and no degreasing) after fluorination and before the resin-impregnated reinforcement was applied, to evaluate an alternative sampling technique. On all the pipes the resin used for adhesion of the reinforcement, and the reinforcement, were applied more or less simultaneously. In other words, the resin applied to the pipe surface was not left to gel before the resin-impregnated fibrous reinforcing layers were applied.

For Example 4, four high density polyethylene pipes were used, the material being GM5010. The pipes were all 90 mm OC class 12 piping having a wall thickness of 10.5 mm. All the pipes were degreased with MEK before fluorination. All the pipes were subjected to a proprietary treatment after fluorination whereby the pipe surfaces were wiped with 5% aqueous HCl solution, using Kimwipe paper, being then rinsed with demineralized water and left to dry. None of the pipes was subjected to any other degreasing after fluorination before reinforcement was applied. The reinforcing technique used was tape wrapping. The primary aim for Example 4 was to evaluate other resins instead of CRYSTIC 600 for adhesion to the pipe of the fibrous reinforcement. On all the pipes the resin applied to the pipe surface, and the reinforcing layers, were applied simultaneously, before any gelling of the adhesive resin applied to the pipe surface.

For Example 5, two polypropylene pipes were used, the material being PPH2222. The pipes were 50 mm OD class 10 piping having a wall thickness of 40 mm. All the pipes were degreased with MEK before fluorination. None of the pipes was degreased after fluorination and before fibrous reinforcement was applied. The reinforcing technique used was hand lamination. The primary aim for Example 5 was to evaluate CRYSTIC 392 as a resin applied to the pipes for adhesion of the fibrous reinforcement to the pipes. On all the pipes this resin was applied as a coating and left to cure before the layers of resin-impregnated fibrous reinforcement were applied.

For Example 6, one high density polyethylene pipe was used, the material being GM5010. The pipe was of 160 mm (OD class 10 piping having a wall thickness of 15.0 mm. The pipe was degreased neither before fluorination nor after fluorination and before reinforcement was applied. The reinforcing technique used was filament winding. The primary aim for Example 6 was to evaluate PRO-STRUCT 7907 as a resin for adhesion of reinforcement to the pipe and PRO-STRUCT 988 as a resin for Impregnating the reinforcement. The PRO-STRUCT 7907 was applied as a coating and left to gel before the layers of resin-impregnated fibrous reinforcement were applied.

Pipe samples were cut from the midpoint outwards and numbered as follows:

| 7 | 5 | 3 | 1 | 2 | 4 | 6 | 8 |
|---|---|---|---|---|---|---|---|

Two testing techniques were used ie a standard and an alternative technique. In the standard technique a 20 mm length of the HDPE or PP was machined out of a 60 mm length of pipe sample for the purposes of liner push-out tests. In the alternative technique 20 mm lengths of pipe samples were cut and no HDPE or PP was machined out. Tooling was designed appropriately for the purpose of liner push-out tests.

The push-out tests involved the pushing of the HDPE liner or the PP liner of each test piece, out of the reinforcing, and the measuring the force required to do so. The shear strength or 'push-out' strength was then calculated as follows:

Shear strength $(MPa) = F/\pi.d.l$ where

F=maximum force required to shear the pipe from the overwrapping (N)

d=pipe outer diameter (mm)

l=liner push-out length (mm)

Results for Examples 1–6 are set forth respectively in Tables 17–22 hereunder.

EXAMPLE 1

TABLE 17

Test Results

| Pipe number (Material) | Adhesion resin | Impregnation resin | Sample Number | Pipe OD (mm) | Push out length (mm) | Failure load (tonnes) | Shear Stress (MPa) | Average of samples (MPa) |
|---|---|---|---|---|---|---|---|---|
| PP1 (Poly-prop) | Dion 9100 | Dion 9100 | PP1/1 | 110 | 20.0 | 5.75 | 8.2 | 8.78 |
|  |  |  | PP1/2 | 110 | 20.0 | 6.14 | 8.7 |  |
|  |  |  | PP1/3 | 110 | 20.0 | 6.40 | 9.1 |  |
|  |  |  | PP1/4 | 110 | 20.0 | 6.50 | 9.2 |  |
|  |  |  | PP1/5 | 110 | 20.0 | 5.82 | 8.3 |  |
|  |  |  | PP1/6 | 110 | 20.0 | 6.50 | 9.2 |  |
| PP2 (Poly-prop) | Crystic 600 | Crystic 600 | PP2/1 | 110 | 20.0 | 7.15 | 10.1 | 9.10 |
|  |  |  | PP2/2 | 110 | 20.0 | 6.00 | 8.5 |  |
|  |  |  | PP2/3 | 110 | 20.0 | 6.22 | 8.8 |  |
|  |  |  | PP2/4 | 110 | 20.0 | 6.41 | 9.1 |  |
|  |  |  | PP2/5 | 110 | 20.0 | 6.70 | 9.5 |  |
|  |  |  | PP2/6 | 110 | 20.0 | 6.00 | 8.5 |  |
| PP3 (Poly-prop) | Dera-kane 470 | Derakane 411 | PP3/1 | 110 | 20.0 | 4.88 | 6.9 | 8.49 |
|  |  |  | PP3/2 | 110 | 20.0 | 5.80 | 8.2 |  |

TABLE 17-continued

Test Results

| Pipe number (Material) | Adhesion resin | Impreg- nation resin | Sample Number | Pipe OD (mm) | Push out length (mm) | Failure load (tonnes) | Shear Stress (MPa) | Average of samples (MPa) |
|---|---|---|---|---|---|---|---|---|
| | | | PP3/3 | 110 | 20.0 | 4.55 | 6.5 | |
| | | | PP3/4 | 110 | 20.0 | 6.80 | 9.7 | |
| | | | PP3/5 | 110 | 20.0 | 7.37 | 10.5 | |
| | | | PP3/6 | 110 | 20.0 | 6.50 | 9.2 | |
| PP4 (Poly-prop) | Dera-kane 8084 | Derakane 411 | PP4/1 | 110 | 20.0 | 5.48 | 7.8 | 7.50 |
| | | | PP4/2 | 110 | 20.0 | 6.00 | 8.5 | |
| | | | PP4/3 | 110 | 20.0 | 4.44 | 6.3 | |
| | | | PP4/4 | 110 | 20.0 | 5.74 | 8.1 | |
| | | | PP4/5 | 110 | 20.0 | 4.88 | 6.9 | |
| | | | PP4/6 | 110 | 20.0 | 5.15 | 7.3 | |
| PP5 (Poly-prop) | Dion 9100 | Crystic 600 | PP5/1 | 110 | 20.0 | 3.30 | 4.7 | 5.22 |
| | | | PP5/2 | 110 | 20.0 | 2.90 | 4.1 | |
| | | | PP5/3 | 110 | 20.0 | 2.42 | 3.4 | |
| | | | PP5/4 | 110 | 20.0 | 4.90 | 7.0 | |
| | | | PP5/5 | 110 | 20.0 | 4.89 | 6.9 | |
| | | | PP5/6 | 110 | 20.0 | 3.66 | 5.2 | |
| PP6 (Poly-prop) | Primer + Crystic 600 | Crystic 600 | PP6/1 | 110 | 20.0 | 5.00 | 7.1 | 8.21 |
| | | | PP6/2 | 110 | 20.0 | 5.80 | 8.2 | |
| | | | PP6/3 | 110 | 20.0 | 5.45 | 7.7 | |
| | | | PP6/4 | 110 | 20.0 | 6.40 | 9.1 | |
| | | | PP6/5 | 110 | 20.0 | 5.65 | 8.0 | |
| | | | PP6/6 | 110 | 20.0 | 6.41 | 9.1 | |

EXAMPLE 2

TABLE 18

Test Results

| Pipe number (material) | Adhesion resin | Impreg- nation resin | Sample number | Pipe OD (mm) | Push out length (mm) | Failure load (kN) | Shear stress (Mpa) | Average of samples (Mpa) |
|---|---|---|---|---|---|---|---|---|
| PP1 (polyprop) | Crystic 600 | Crystic 600 | PP1/1 | 90 | 20.0 | 13.69 | 2.4 | 9.82 |
| | | | PP1/2 | 90 | 20.0 | 19.38 | 3.4 | |
| | | | PP1/3 | 90 | 20.0 | 69.38 | 12.3 | |
| | | | PP1/4 | 90 | 20.0 | 65.96 | 11.7 | |
| | | | PP1/5 | 90 | 20.0 | 64.74 | 11.4 | |
| | | | PP1/6 | 90 | 20.0 | 70.50 | 12.5 | |
| | | | PP1/7 | 90 | 20.0 | 68.63 | 12.1 | |
| | | | PP1/8 | 90 | 20.0 | 72.06 | 12.7 | |
| PP2 (polyprop) | Crystic 600 | Crystic 600 | PP2/1 | 90 | 20.0 | 9.69 | 1.7 | 9.64 |
| | | | PP2/2 | 90 | 20.0 | 57.41 | 10.2 | |
| | | | PP2/3 | 90 | 20.0 | 56.70 | 10.0 | |
| | | | PP2/4 | 90 | 20.0 | 58.27 | 10.3 | |
| | | | PP2/5 | 90 | 20.0 | 61.31 | 10.8 | |
| | | | PP2/6 | 90 | 20.0 | 65.36 | 11.6 | |
| | | | PP2/7 | 90 | 20.0 | 60.38 | 10.7 | |
| | | | PP2/8 | 90 | 20.0 | 66.97 | 11.8 | |
| PP3 (Polyprop) | Crystic 600 | Crystic 600 | PP3/1 | 90 | 20.0 | 61.60 | 10.9 | 10.63 |
| | | | PP3/2 | 90 | 20.0 | 67.04 | 11.9 | |
| | | | PP3/3 | 90 | 20.0 | 69.09 | 12.2 | |
| | | | PP3/4 | 90 | 20.0 | 60.70 | 10.7 | |
| | | | PP3/5 | 90 | 20.0 | 57.80 | 10.2 | |
| | | | PP3/6 | 90 | 20.0 | 64.40 | 11.4 | |
| | | | PP3/7 | 90 | 20.0 | 63.70 | 11.3 | |
| | | | PP3/8 | 90 | 20.0 | 36.28 | 6.4 | |
| PP4 (Polyprop) | Crystic 600 | Crystic 600 | PP4/1 | 90 | 20.0 | 11.48 | 2.0 | 7.60 |
| | | | PP4/2 | 90 | 20.0 | 46.87 | 8.3 | |
| | | | PP4/3 | 90 | 20.0 | 14.36 | 2.5 | |
| | | | PP4/4 | 90 | 20.0 | 63.91 | 11.3 | |
| | | | PP4/5 | 90 | 20.0 | 63.65 | 11.3 | |
| | | | PP4/6 | 90 | 20.0 | 5.85 | 1.0 | |
| | | | PP4/7 | 90 | 20.0 | 69.43 | 12.3 | |
| | | | PP4/8 | 90 | 20.0 | 68.11 | 12.0 | |

EXAMPLE 3

TABLE 19

| Pipe number (material) | Adhesion resin | Impregnation resin | Test Results | | | | | Test Results (Alternative Sampling Technique) | | | | |
|---|---|---|---|---|---|---|---|---|---|---|---|---|
| | | | Sample number | Pipe Od (mm) | Push out length (mm) | Failure load (kN) | Shear stress (Mpa) | Average of samples (Mpa) | Sample number | Pipe OD (mm) | Push out length (mm) | Failure load (kN) | Shear stress (Mpa) |
| PP1 (Polyprop) | Crystic 600 | Crystic 600 | PP1/1 | 110 | 20.0 | 57.07 | 8.3 | 7.77 | PP1/A | 110 | 20 | 92.46 | 13.4 |
| | | | PP1/2 | 110 | 20.0 | 48.25 | 7.0 | | PP1/B | 110 | 20 | 90.06 | 13.0 |
| | | | PP1/3 | 110 | 20.0 | 72.13 | 10.4 | | | | | | |
| | | | PP1/4 | 110 | 20.0 | 52.14 | 7.5 | | | | | | |
| | | | PP1/5 | 110 | 20.0 | 64.30 | 9.3 | | | | | | |
| | | | PP1/6 | 110 | 20.0 | 35.37 | 5.1 | | | | | | |
| | | | PP1/7 | 110 | 20.0 | 63.12 | 9.1 | | | | | | |
| | | | PP1/8 | 110 | 20.0 | 37.31 | 5.4 | | | | | | |
| PP2 (Polyprop) | Crystic 600 | Crystic 600 | PP2/1 | 110 | 20.0 | 73.13 | 10.6 | 11.04 | PP2/A | 110 | 20 | 93.04 | 13.5 |
| | | | PP2/2 | 110 | 20.0 | 82.53 | 11.9 | | PP2/B | 110 | 20 | 99.56 | 14.4 |
| | | | PP2/3 | 110 | 20.0 | 64.00 | 9.3 | | | | | | |
| | | | PP2/4 | 110 | 20.0 | 86.71 | 12.5 | | | | | | |
| | | | PP2/5 | 110 | 20.0 | 59.85 | 8.7 | | | | | | |
| | | | PP2/6 | 110 | 20.0 | 87.66 | 12.7 | | | | | | |
| | | | PP2/7 | 110 | 20.0 | 73.32 | 10.6 | | | | | | |
| | | | PP2/8 | 110 | 20.0 | 83.26 | 12.0 | | | | | | |
| PP3 (Polyprop) | Crystic 600 | Crystic 600 | PP3/1 | 110 | 20.0 | 41.81 | 6.0 | 8.55 | PP3/A | 110 | 20 | 97.54 | 14.1 |
| | | | PP3/2 | 110 | 20.0 | 59.45 | 8.6 | | PP3/B | 110 | 20 | 97.17 | 14.1 |
| | | | PP3/3 | 110 | 20.0 | 51.23 | 7.4 | | | | | | |
| | | | PP3/4 | 110 | 20.0 | 67.55 | 9.8 | | | | | | |
| | | | PP3/5 | 110 | 20.0 | 69.78 | 10.1 | | | | | | |
| | | | PP3/6 | 110 | 20.0 | 49.50 | 7.2 | | | | | | |
| | | | PP3/7 | 110 | 20.0 | 64.21 | 9.3 | | | | | | |
| | | | PP3/8 | 110 | 20.0 | 69.20 | 10.0 | | | | | | |
| PP4 (Polyprop) | Crystic 600 | Crystic 600 | PP4/1 | 110 | 20.0 | 58.81 | 8.5 | 10.32 | PP7/A | 110 | 20 | 65.46 | 9.5 |
| | | | PP4/2 | 110 | 20.0 | 78.85 | 11.4 | | PP7/B | 110 | 20 | 96.69 | 14.0 |
| | | | PP4/3 | 110 | 20.0 | 77.32 | 11.2 | | | | | | |
| | | | PP4/4 | 110 | 20.0 | 70.94 | 10.3 | | | | | | |
| | | | PP4/5 | 110 | 20.0 | 75.52 | 10.9 | | | | | | |
| | | | PP4/6 | 110 | 20.0 | 63.64 | 9.2 | | | | | | |
| | | | PP4/7 | 110 | 20.0 | 74.11 | 10.7 | | | | | | |
| PE1 (Polyethylene) | Crystic 600 | Crystic 600 | PE1/1 | 110 | 20.0 | 75.53 | 10.9 | 10.11 | PE1/A | 110 | 20 | 88.42 | 12.8 |
| | | | PE1/2 | 110 | 20.0 | 68.42 | 9.9 | | PE1/B | 110 | 20 | 86.10 | 12.5 |
| | | | PE1/3 | 110 | 20.0 | 76.92 | 11.1 | | | | | | |
| | | | PE1/4 | 110 | 20.0 | 74.93 | 10.8 | | | | | | |
| | | | PE1/5 | 110 | 20.0 | 52.88 | 7.7 | | | | | | |
| | | | PE1/6 | 110 | 20.0 | 73.75 | 10.7 | | | | | | |
| | | | PE1/7 | 110 | 20.0 | S8.62 | 6.5 | | | | | | |
| | | | PE1/8 | 110 | 20.0 | 77.84 | 11.3 | | | | | | |
| PE2 (Polyethylene) | Crystic 600 | Crystic 600 | PE2/1 | 110 | 20.0 | 74.08 | 10.7 | 10.02 | PE2/A | 110 | 20 | 94.63 | 13.7 |
| | | | PE2/2 | 110 | 20.0 | 72.89 | 10.5 | | PE2/B | 110 | 20 | 90.22 | 13.1 |
| | | | PE2/3 | 110 | 20.0 | 76.71 | 11.1 | | | | | | |
| | | | PE2/4 | 110 | 20.0 | 78.48 | 11.4 | | | | | | |
| | | | PE2/5 | 110 | 20.0 | 75.61 | 10.9 | | | | | | |
| | | | PE2/6 | 110 | 20.0 | 69.55 | 10.1 | | | | | | |
| | | | PE2/7 | 110 | 20.0 | 74.81 | 10.8 | | | | | | |
| | | | PE2/8 | 110 | 20.0 | 75.91 | 11.0 | | | | | | |
| PE3 (Polyethylene) | Crystic 600 | Crystic 600 | PE3/1 | 110 | 20.0 | 42.89 | 6.2 | 7.82 | PE3/A | 110 | 20 | 73.36 | 10.6 |
| | | | PE3/2 | 110 | 20.0 | 46.47 | 6.7 | | PE3/B | 110 | 20 | 64.74 | 9.4 |
| | | | PE3/3 | 110 | 20.0 | 46.60 | 6.7 | | | | | | |
| | | | PE3/4 | 110 | 20.0 | 51.42 | 7.4 | | | | | | |
| | | | PE3/5 | 110 | 20.0 | 61.72 | 8.9 | | | | | | |
| | | | PE3/6 | 110 | 20.0 | 58.73 | 8.5 | | | | | | |
| | | | PE3/7 | 110 | 20.0 | 67.53 | 9.8 | | | | | | |
| | | | PE3/8 | 110 | 20.0 | 56.92 | 8.2 | | | | | | |
| PE4 (Polyethylene) | Crystic 600 | Crystic 600 | PE4/1 | 110 | 20.0 | 18.35 | 2.7 | 5.32 | PE4/A | 110 | 20 | 67.53 | 9.8 |
| | | | PE4/2 | 110 | 20.0 | 39.39 | 5.7 | | PE4/B | 110 | 20 | 65.65 | 9.5 |
| | | | PE4/3 | 110 | 20.0 | 33.72 | 4.9 | | | | | | |
| | | | PE4/4 | 110 | 20.0 | 63.04 | 9.1 | | | | | | |
| | | | PE4/5 | 110 | 20.0 | 10.24 | 1.5 | | | | | | |
| | | | PE4/6 | 110 | 20.0 | 48.05 | 7.0 | | | | | | |
| | | | PE4/7 | 110 | 20.0 | 20.96 | 3.0 | | | | | | |
| | | | PE4/8 | 110 | 20.0 | 60.39 | 8.7 | | | | | | |

EXAMPLE 4

TABLE 20

| | TEST RESULTS | | TEST RESULTS (ALTERNATIVE SAMPLING TECHNIQUE) | | | | |
|---|---|---|---|---|---|---|---|
| Pipe Number (Material) | Adhesion resin | Impregnation resin | Sample number | Pipe OD (mm) | Push out length (mm) | Failure load (kN) | Shear Stress (Mpa) |
| PE1 Standard wall thickness (Polyethylene) | Crystic 600 NCS | Crystic 600 NCS | PE1/A PE1/B | 90 90 | 20 20 | 57.78 60.54 | 10.2 10.7 |
| PE2 Standard wall thickness (Polyethylene) | Crystic 600SB | Crystic 600SB | PE2/A PE2/B | 90 90 | 20 20 | 69.58 63.12 | 12.3 11.2 |
| PE3 Standard wall thickness (Polyethylene) | Dion 6694 | Dion 6694 | PE3/A PE3/B | 90 90 | 20 20 | 56.89 53.89 | 10.1 9.5 |
| PE4 Standard wall thickness (Polyethylene) | Crystic 392 | Crystic 392 | PE4/A PE4/B | 90 90 | 20 20 | 66.66 64.03 | 11.8 11.3 |

EXAMPLE 5

TABLE 21

TEST RESULTS

| Pipe number | Adhesion resin | Impregnation resin | Sample number | Pipe OD (mm) | Push out length (mm) | Failure load (kN) | Shear Stress (Mpa) | Average of samples (Mpa) |
|---|---|---|---|---|---|---|---|---|
| PP1 (Polyprop) | Crystic 392 | Derakane 411 | PP1/1 PP1/2 PP1/3 PP1/4 PP1/5 | 50 50 50 50 50 | 20.0 20.0 20.0 20.0 20.0 | 31.59 30.12 31.54 31.49 32.00 | 10.1 9.6 10.0 10.0 10.2 | 9.98 |
| PP2 (Polyprop) | Crystic 392 | Derakane 411 | PP2/1 PP2/2 PP2/3 PP2/4 PP2/5 | 50 50 50 50 50 | 20.0 20.0 20.0 20.0 20.0 | 28.66 31.99 32.43 30.16 31.64 | 9.1 10.2 10.3 9.6 10.1 | 9.86 |

EXAMPLE 6

TABLE 22

Test Results

| Pipe number (Material) | Adhesion resin | Impregnation resin | Sample number | Pipe OD (mm) | Push out length (mm) | Failure load (kN) | Shear Stress (Mpa) | Average of samples (Mpa) |
|---|---|---|---|---|---|---|---|---|
| PE1 (Polyethylene) | Pro-Struct 7909 | Pro-Struct 988 | PE1/1 PE1/2 PE1/3 PE1/4 PE1/5 PE1/6 | 160 160 160 160 160 160 | 10.36 13.53 13.54 14.86 12.04 15.33 | 40.28 44.88 70.17 67.23 65.17 76.64 | 7.7 6.6 10.3 9.0 10.8 9.9 | 9.06 |

It is an advantage of the invention that it permits polyolefin pipes and tanks to be strengthened or reinforced by a resin-impregnated fibrous wrapping material. As the bond between the resin and the surface activated pipe or tank is believed to be a chemical bond, the process is less labour intensive than similar processes in which the bond is a mechanical bond. As a result, the pipes or tanks, eg glass fibre reinforced PP pipes or tanks, can be manufactured at lower cost.

We claim:

1. In the production of a component of a plastics material which is strengthened and reinforced by a fibrous material which has been impregnated with a resin which adheres to a surface of the component, by contacting said surface of the component with said fibrous material impregnated with the resin in a settable state, and effecting setting of the resin to cause said resin-impregnated fibrous material to adhere to said surface of the component, the process which comprises using as the plastics material a polyolefin material and which includes the step, prior to the contacting, of subjecting said surface of the component to activation thereof, the activation being by surface fluorination in the form of oxyfluorination by exposing the surface of the component to an activating gas consisting essentially of molecules and comprising fluorine-containing molecules and oxygen-containing molecules at a pressure of 1–500 kPa, the gas being at a temperature of above 0° C., the plastics material of the component having a melting point above said gas temperature and the oxyfluorination acting to incorporate fluorine-containing substituents and oxygen-containing substituents, derived from molecules of the activating gas, into the surface of the component.

2. A process as claimed in claim 1, in which the polyolefin material is selected from the group consisting of polyethylenes, polypropylenes, copolymers of ethylene and propylene and blends of such polymers.

3. A process as claimed in claim 1, in which the surface activation acts to provide the surface-activated component with a surface tension at 20° C. of at least 40 mN/m.

4. A process as claimed in claim 1, in which the activating gas comprises a fluorine-containing gas which forms part of a gas mixture with other gases, the fluorine-containing gas forming 1–30% by volume of said gas mixture and the temperature of the gas mixture being 20–100° C.

5. A process as claimed in claim 4, in which the gas mixture comprises 5–20% by volume of the fluorine-containing gas and 5–95% by volume of oxygen.

6. A process as claimed in claim 5, in which, after said oxyfluorination, the surface is subjected to hydrolysis.

7. A process as claimed in claim 1, in which the fibrous material is subjected to surface fluorination thereof prior to impregnation thereof with resin.

8. A process as claimed in claim 7, in which the fibrous material has fibres which are selected from the group consisting of polyester fibres, polyamide fibres, polyolefin fibres and mixtures thereof.

9. A process as claimed in claim 1, in which the surface is subjected to degreasing prior to said activation thereof.

10. A process as claimed in claim 1, in which the surface, after said activation thereof and prior to the contacting, is subjected to degreasing.

11. A process as claimed in claim 1, in which causing the fibrous material to adhere to the surface of the component is by means of a resin which is different from the resin which impregnates the fibrous material, each resin being selected from epoxy resins and polyester resins.

12. A process as claimed in claim 1, in which causing the fibrous material to adhere to the surface of the component is by means of a resin which is the same as the resin which impregnates the fibrous material, each resin being selected from epoxy resins and polyester resins.

13. A component of a plastics material which is strengthened and reinforced by a resin-impregnated fibrous material which adheres to a surface of the component, produced in accordance with the process of claim 1.

* * * * *

UNITED STATES PATENT AND TRADEMARK OFFICE
CERTIFICATE OF CORRECTION

PATENT NO. : 5,792,528
DATED : Aug. 11, 1998
INVENTOR(S) : Carstens et al.

It is certified that error appears in the above-identified patent and that said Letters Patent is hereby corrected as shown below:

On the title page, item [56], under References Cited, insert the following:

| | | | | | | | PUBLICATION | COUNTRY OR | | | TRANSLATION | |
|---|---|---|---|---|---|---|---|---|---|---|---|---|
| | | \multicolumn{6}{c}{DOCUMENT NUMBER} | DATE | ATENT OFFIC | LASS | UBCLASS | YES | NO |
| | | UE | P0 | 2 | 1 | 46 | 3 | 5 | 03/18/87 | Lohmann | | | |
| | | YN | L7 | 4 | 0 | 28 | 9 | 9 | 03/04/74 | Air Products | | | |

Signed and Sealed this

Sixteenth Day of February, 1999

Attest:

Attesting Officer

Acting Commissioner of Patents and Trademarks